US008641532B2

(12) United States Patent
Morrow et al.

(10) Patent No.: US 8,641,532 B2
(45) Date of Patent: Feb. 4, 2014

(54) GAMING DEVICE HAVING TWO CARD READERS

(75) Inventors: James W. Morrow, Sparks, NV (US); Carmen DiMichele, Sparks, NV (US); Lars A. Perry, Reno, NV (US); Michael M. LeStrange, Henderson, NV (US); Robert Luciano, Reno, NV (US); Lawrence McAllister, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1386 days.

(21) Appl. No.: 12/112,231

(22) Filed: Apr. 30, 2008

(65) Prior Publication Data

US 2009/0005176 A1 Jan. 1, 2009

Related U.S. Application Data

(63) Continuation-in-part of application No. 11/223,799, filed on Sep. 8, 2005, now abandoned.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................. 463/43; 463/20; 463/21; 463/25; 463/40; 463/42

(58) Field of Classification Search
USPC ............................. 463/20, 21, 25, 40, 43, 42
See application file for complete search history.

(56) References Cited

U.S. PATENT DOCUMENTS

| | | | | |
|---|---|---|---|---|
| 3,787,660 | A | 1/1974 | Meyers et al. | 235/61.9 R |
| 4,108,361 | A | 8/1978 | Krause | 235/375 |
| 4,339,798 | A | 7/1982 | Hedges et al. | 364/412 |
| 4,373,726 | A | 2/1983 | Churchill et al. | 273/138 A |
| 4,725,079 | A | 2/1988 | Koza et al. | 283/73 |
| 4,802,218 | A | 1/1989 | Wright et al. | 380/23 |
| 4,832,341 | A | 5/1989 | Muller et al. | 273/139 |
| 5,053,612 | A | 10/1991 | Pielemeier et al. | 235/462 |
| 5,156,397 | A | 10/1992 | Valenza, Jr. | 273/138 A |
| 5,179,517 | A | 1/1993 | Sarbin et al. | 364/410 |
| 5,265,874 | A | 11/1993 | Dickinson et al. | 273/138 A |
| 5,273,281 | A | 12/1993 | Lovell | 273/138 R |

(Continued)

FOREIGN PATENT DOCUMENTS

EP 0805424 A2 11/1997

OTHER PUBLICATIONS

Bally TMS, "MP21—Automated Table Tracking/Features," 2 pages, Nov. 2005.

(Continued)

*Primary Examiner* — Adetokunbo O Torimiro
(74) *Attorney, Agent, or Firm* — Frank Abramonte; Fearon Brown; Marvin Hein

(57) ABSTRACT

A gaming device includes a housing and a game display carried by the housing for displaying one or more games. The gaming device further includes two card readers carried by the housing: a first card reader to read information indicative of a player identity from a player club card issued by a casino, and a second card reader to read information indicative of a financial account from a financial card issued by a financial institution.

27 Claims, 10 Drawing Sheets

(56) References Cited

U.S. PATENT DOCUMENTS

| | | | | |
|---|---|---|---|---|
| 5,321,241 | A | 6/1994 | Craine | 235/380 |
| 5,429,361 | A * | 7/1995 | Raven et al. | 463/25 |
| 5,487,544 | A | 1/1996 | Clapper, Jr. | 273/138 A |
| 5,493,613 | A | 2/1996 | Denno et al. | 380/24 |
| 5,505,461 | A | 4/1996 | Bell et al. | 273/433 |
| 5,559,312 | A | 9/1996 | Lucero | 235/380 |
| 5,595,538 | A | 1/1997 | Haste, III | 463/17 |
| 5,613,680 | A | 3/1997 | Groves et al. | 273/138.2 |
| 5,655,961 | A | 8/1997 | Acres et al. | 463/27 |
| 5,697,844 | A | 12/1997 | Von Kohorn | 463/40 |
| 5,770,533 | A | 6/1998 | Franchi | 463/42 |
| 5,800,268 | A | 9/1998 | Molnick | 463/40 |
| 5,813,912 | A | 9/1998 | Shultz | 463/25 |
| 5,816,918 | A | 10/1998 | Kelly et al. | |
| 5,830,067 | A | 11/1998 | Graves et al. | 463/40 |
| 5,851,149 | A | 12/1998 | Xidos et al. | 463/42 |
| 5,902,983 | A | 5/1999 | Crevelt et al. | |
| 5,903,874 | A | 5/1999 | Leonard et al. | 705/14 |
| 5,919,091 | A | 7/1999 | Bell et al. | 463/25 |
| 5,999,808 | A | 12/1999 | LaDue | 455/412 |
| 6,015,344 | A | 1/2000 | Kelly et al. | 463/16 |
| 6,048,269 | A | 4/2000 | Burns et al. | 463/25 |
| 6,062,481 | A | 5/2000 | Storch et al. | 235/494 |
| 6,083,105 | A | 7/2000 | Ronin et al. | 463/17 |
| 6,113,493 | A | 9/2000 | Walker et al. | |
| 6,190,256 | B1 | 2/2001 | Walker et al. | 463/25 |
| 6,227,972 | B1 | 5/2001 | Walker et al. | 463/25 |
| 6,234,898 | B1 | 5/2001 | Belamant et al. | 463/25 |
| 6,244,958 | B1 | 6/2001 | Acres | 463/26 |
| 6,280,328 | B1 | 8/2001 | Holch et al. | |
| 6,282,522 | B1 | 8/2001 | Davis et al. | |
| 6,347,738 | B1 | 2/2002 | Crevelt et al. | 235/380 |
| 6,364,768 | B1 | 4/2002 | Acres et al. | 463/25 |
| 6,394,907 | B1 | 5/2002 | Rowe | 463/42 |
| 6,409,602 | B1 | 6/2002 | Wiltshire et al. | 463/42 |
| 6,464,584 | B2 | 10/2002 | Oliver | 463/25 |
| 6,468,155 | B1 | 10/2002 | Zucker et al. | 463/23 |
| 6,478,676 | B1 | 11/2002 | Dayan | 463/17 |
| 6,505,772 | B1 | 1/2003 | Mollett et al. | 235/379 |
| 6,508,709 | B1 | 1/2003 | Karmarkar | 463/42 |
| 6,527,638 | B1 | 3/2003 | Walker et al. | 463/25 |
| 6,547,131 | B1 | 4/2003 | Foodman et al. | 235/380 |
| 6,575,832 | B1 | 6/2003 | Manfredi et al. | 463/25 |
| 6,575,834 | B1 | 6/2003 | Lindo | 463/40 |
| 6,579,179 | B2 | 6/2003 | Poole et al. | 463/25 |
| 6,585,598 | B2 | 7/2003 | Nguyen et al. | 463/41 |
| 6,605,001 | B1 | 8/2003 | Tarantino | 463/22 |
| 6,607,441 | B1 | 8/2003 | Acres | 463/25 |
| 6,612,928 | B1 | 9/2003 | Bradford et al. | 463/29 |
| 6,629,591 | B1 | 10/2003 | Griswold et al. | 194/205 |
| 6,652,379 | B2 | 11/2003 | Soltys et al. | 463/22 |
| 6,676,522 | B2 | 1/2004 | Rowe et al. | 463/42 |
| 6,682,421 | B1 | 1/2004 | Rowe et al. | 463/25 |
| 6,702,291 | B2 | 3/2004 | Grebler et al. | 273/292 |
| 6,712,698 | B2 | 3/2004 | Paulsen et al. | |
| 6,722,985 | B2 | 4/2004 | Criss-Puszkiewicz et al. | |
| 6,739,975 | B2 | 5/2004 | Nguyen et al. | 463/39 |
| 6,746,330 | B2 | 6/2004 | Cannon | 463/25 |
| 6,752,312 | B1 | 6/2004 | Chamberlain et al. | 235/375 |
| 6,755,741 | B1 | 6/2004 | Rafaeli | 463/25 |
| 6,800,029 | B2 | 10/2004 | Rowe et al. | 463/25 |
| 6,811,486 | B1 | 11/2004 | Luciano, Jr. | 463/24 |
| 6,837,789 | B2 | 1/2005 | Garahi et al. | 463/29 |
| 6,866,586 | B2 | 3/2005 | Oberberger et al. | 463/42 |
| 6,905,411 | B2 | 6/2005 | Nguyen et al. | 463/25 |
| 6,971,956 | B2 | 12/2005 | Rowe et al. | 463/25 |
| 7,035,626 | B1 | 4/2006 | Luciano, Jr. | 455/414.1 |
| 7,063,617 | B2 | 6/2006 | Brosnan et al. | 463/25 |
| 7,077,332 | B2 | 7/2006 | Verschuur et al. | 235/492 |
| 7,086,947 | B2 | 8/2006 | Walker et al. | 463/25 |
| 7,099,035 | B2 | 8/2006 | Brooks et al. | 358/1.15 |
| 7,103,438 | B2 | 9/2006 | Hallowell et al. | 700/116 |
| 7,118,479 | B2 | 10/2006 | D'Amico et al. | 463/25 |
| 7,303,475 | B2 | 12/2007 | Britt et al. | 463/42 |
| 7,331,520 | B2 | 2/2008 | Silva et al. | 235/381 |
| 7,361,085 | B2 | 4/2008 | Packes, Jr. et al. | 463/16 |
| 7,419,428 | B2 | 9/2008 | Rowe | 463/25 |
| 7,427,233 | B2 | 9/2008 | Walker et al. | 463/16 |
| 7,510,474 | B2 | 3/2009 | Carter, Sr. | 463/29 |
| 7,534,169 | B2 | 5/2009 | Amaitis et al. | 463/39 |
| 7,566,274 | B2 | 7/2009 | Johnson et al. | 463/42 |
| 7,575,234 | B2 | 8/2009 | Soltys et al. | 273/149 R |
| 7,617,151 | B2 | 11/2009 | Rowe | 705/39 |
| 7,637,810 | B2 | 12/2009 | Amaitis et al. | 463/25 |
| 7,644,861 | B2 | 1/2010 | Alderucci et al. | 235/382 |
| 7,648,414 | B2 | 1/2010 | McNutt et al. | 463/25 |
| 7,684,874 | B2 | 3/2010 | Schlottmann et al. | 700/9 |
| 7,685,516 | B2 | 3/2010 | Fischer | 715/255 |
| 7,690,995 | B2 | 4/2010 | Frankulin et al. | 463/41 |
| 7,722,453 | B2 | 5/2010 | Lark et al. | 463/16 |
| 7,753,789 | B2 | 7/2010 | Walker et al. | 463/42 |
| 7,753,790 | B2 | 7/2010 | Nguyen et al. | 463/42 |
| 7,780,526 | B2 | 8/2010 | Nguyen et al. | 463/29 |
| 7,824,267 | B2 | 11/2010 | Cannon et al. | 463/42 |
| 7,850,528 | B2 | 12/2010 | Wells | 463/42 |
| 7,857,702 | B2 | 12/2010 | Hilbert | 463/47 |
| 7,901,294 | B2 | 3/2011 | Walker et al. | 463/42 |
| 8,062,121 | B2 | 11/2011 | Crivelli | 462/25 |
| 2002/0111213 | A1 | 8/2002 | McEntee et al. | 463/42 |
| 2002/0113371 | A1 | 8/2002 | Snow | 273/292 |
| 2002/0142844 | A1 | 10/2002 | Kerr | |
| 2003/0004871 | A1 | 1/2003 | Rowe | 705/39 |
| 2003/0042679 | A1 | 3/2003 | Snow | 273/292 |
| 2003/0090064 | A1 | 5/2003 | Hoyt et al. | 273/292 |
| 2003/0104865 | A1 | 6/2003 | Itkis et al. | 463/39 |
| 2003/0186739 | A1 | 10/2003 | Paulsen et al. | 463/25 |
| 2003/0232640 | A1 | 12/2003 | Walker et al. | 463/16 |
| 2003/0232651 | A1 | 12/2003 | Huard et al. | 463/42 |
| 2004/0002379 | A1 | 1/2004 | Parrott et al. | 463/29 |
| 2004/0029635 | A1 | 2/2004 | Giobbi | 463/30 |
| 2004/0087360 | A1 * | 5/2004 | Chamberlain et al. | 463/25 |
| 2004/0127291 | A1 | 7/2004 | George et al. | 463/42 |
| 2004/0132529 | A1 | 7/2004 | Mkrtchyan et al. | 463/29 |
| 2004/0142744 | A1 | 7/2004 | Atkinson et al. | 463/29 |
| 2004/0143496 | A1 | 7/2004 | Saenz | 705/14 |
| 2005/0043094 | A1 | 2/2005 | Nguyen et al. | 463/42 |
| 2005/0054438 | A1 | 3/2005 | Rothschild et al. | 463/29 |
| 2005/0064933 | A1 | 3/2005 | Davis | |
| 2005/0070358 | A1 | 3/2005 | Angell et al. | 463/39 |
| 2005/0124411 | A1 | 6/2005 | Schneider et al. | 463/29 |
| 2005/0176507 | A1 | 8/2005 | Ephrati et al. | 463/39 |
| 2005/0227760 | A1 | 10/2005 | Vlazny et al. | 463/28 |
| 2005/0266919 | A1 | 12/2005 | Rowe et al. | 463/25 |
| 2005/0282626 | A1 | 12/2005 | Manfredi et al. | 463/25 |
| 2006/0009282 | A1 | 1/2006 | George et al. | 463/29 |
| 2006/0019745 | A1 | 1/2006 | Benbrahim | 463/29 |
| 2006/0035707 | A1 | 2/2006 | Nguyen et al. | 463/29 |
| 2006/0046849 | A1 | 3/2006 | Kovacs | 463/39 |
| 2006/0058100 | A1 | 3/2006 | Pacey et al. | |
| 2006/0068874 | A1 | 3/2006 | Hornik et al. | |
| 2006/0079317 | A1 | 4/2006 | Flemming et al. | |
| 2006/0121970 | A1 | 6/2006 | Khal | 463/16 |
| 2006/0121978 | A1 | 6/2006 | Hornik et al. | |
| 2006/0183541 | A1 | 8/2006 | Okada et al. | 463/29 |
| 2006/0205484 | A1 * | 9/2006 | Nicastro | 463/25 |
| 2006/0205508 | A1 | 9/2006 | Green | 463/40 |
| 2006/0247047 | A1 | 11/2006 | Mitchell et al. | |
| 2007/0015583 | A1 | 1/2007 | Tran | 463/40 |
| 2007/0054725 | A1 | 3/2007 | Morrow et al. | 463/16 |
| 2007/0060259 | A1 | 3/2007 | Pececnik | 463/16 |
| 2007/0060310 | A1 | 3/2007 | Juds et al. | |
| 2007/0077990 | A1 | 4/2007 | Cuddy et al. | 463/25 |
| 2007/0111775 | A1 | 5/2007 | Yoseloff | 463/16 |
| 2007/0117608 | A1 | 5/2007 | Roper et al. | 463/16 |
| 2007/0167235 | A1 | 7/2007 | Naicker | 463/42 |
| 2007/0198418 | A1 | 8/2007 | Macdonald et al. | 705/52 |
| 2007/0208816 | A1 | 9/2007 | Baldwin et al. | 709/206 |
| 2007/0235521 | A1 | 10/2007 | Mateen et al. | 235/379 |
| 2007/0243925 | A1 | 10/2007 | LeMay et al. | 463/20 |
| 2007/0243927 | A1 | 10/2007 | Soltys | 463/25 |
| 2007/0243935 | A1 | 10/2007 | Huizinga | 463/42 |
| 2007/0259709 | A1 | 11/2007 | Kelly et al. | 463/20 |
| 2008/0004100 | A1 | 1/2008 | Hein et al. | |
| 2008/0004108 | A1 | 1/2008 | Klinkhammer | 463/29 |

(56) References Cited

U.S. PATENT DOCUMENTS

| | | | | |
|---|---|---|---|---|
| 2008/0009344 | A1 | 1/2008 | Graham et al. | 463/25 |
| 2008/0038035 | A1 | 2/2008 | Shuldman et al. | 400/76 |
| 2008/0076572 | A1 | 3/2008 | Nguyen et al. | 463/42 |
| 2008/0090651 | A1 | 4/2008 | Baerlocher | 463/27 |
| 2008/0096659 | A1 | 4/2008 | Kreloff et al. | 463/39 |
| 2008/0113773 | A1 | 5/2008 | Johnson et al. | 463/25 |
| 2008/0119284 | A1 | 5/2008 | Luciano, Jr. et al. | 463/42 |
| 2008/0146337 | A1 | 6/2008 | Halonen et al. | 463/42 |
| 2008/0261701 | A1 | 10/2008 | Lewin et al. | 463/43 |
| 2008/0311971 | A1 | 12/2008 | Dean | 463/20 |
| 2009/0005176 | A1 | 1/2009 | Morrow et al. | 463/43 |
| 2009/0069076 | A1* | 3/2009 | Silvestro | 463/25 |
| 2009/0115133 | A1 | 5/2009 | Kelly et al. | 273/274 |
| 2009/0117994 | A1 | 5/2009 | Kelly et al. | 463/25 |
| 2009/0118001 | A1 | 5/2009 | Kelly et al. | 463/29 |
| 2009/0118005 | A1 | 5/2009 | Kelly et al. | 463/31 |
| 2009/0118014 | A1* | 5/2009 | Finnimore et al. | 463/42 |
| 2009/0124376 | A1 | 5/2009 | Kelly et al. | 463/29 |
| 2009/0131143 | A1 | 5/2009 | Kelly | 463/19 |
| 2009/0163279 | A1 | 6/2009 | Kermansen et al. | 463/42 |
| 2009/0270174 | A1 | 10/2009 | Kelly et al. | 463/42 |
| 2009/0275374 | A1 | 11/2009 | Nelson et al. | 463/16 |
| 2009/0275393 | A1 | 11/2009 | Kisenwether et al. | 463/25 |
| 2009/0275398 | A1 | 11/2009 | Nelson | 463/27 |
| 2009/0275399 | A1 | 11/2009 | Kelly et al. | 463/27 |
| 2009/0275402 | A1 | 11/2009 | Backover et al. | 463/29 |
| 2009/0275411 | A1 | 11/2009 | Kisenwether et al. | 463/42 |
| 2009/0276715 | A1 | 11/2009 | Arbogast et al. | 715/736 |
| 2009/0307069 | A1 | 12/2009 | Meyerhofer | 705/14.12 |
| 2009/0325708 | A9 | 12/2009 | Kerr | 463/42 |
| 2010/0016068 | A1 | 1/2010 | White et al. | 463/25 |
| 2010/0125851 | A1 | 5/2010 | Singh et al. | 718/104 |
| 2010/0130280 | A1 | 5/2010 | Arezina et al. | 463/20 |
| 2011/0183747 | A1 | 7/2011 | Cole | 463/25 |

OTHER PUBLICATIONS

Bally Technologies, Inc., iVIEW, URL=http://ballytech.com/systems/product.cfm?id=9, download date Nov. 6, 2007, 2 pages.

* cited by examiner

GAMING DEVICE HAVING TWO CARD READERS

CROSS-REFERENCE TO RELATED APPLICATIONS

This application is a continuation-in-part of U.S. patent application Ser. No. 11/223,799, filed Sep. 8, 2005, which application is hereby incorporated herein by reference in its entirety.

BACKGROUND

1. Technical Field

This description generally relates to the field of gaming devices, and more particularly to card readers for gaming devices.

2. Description of the Related Art

Traditionally, gaming devices have been designed for the sole purpose of presenting a game of chance, a game of skill, or a combination thereof. Accordingly, gaming devices have been constructed only to include gaming functionality. Recently, however, casino operators have become aware that by providing additional features in gaming devices, such features may maintain a player's attention at the gaming devices for a longer period of time. For example, secondary displays have been added to gaming devices to provide players with access to gaming-related information, news, and advertisements. The gaming-related information may include, for example, information on sports betting and various betting options relating to sporting events. Additionally, the gaming-related information may include other gaming information, such as horse racing and off-track betting. News and advertisements can also maintain a player's attention by providing the player with access to information, such as, but not limited to, casino attractions, show times, restaurant and hotel specials, and world events. Additionally, these secondary displays allow casino operators to focus promotions and marketing. Accordingly, the promotions and focused marketing presented on these displays may be used to encourage further game play. Thus, a player's desire or need to leave the gaming device may be reduced by providing the player with access to such non-gaming information. This, in turn, increases player wagering by encouraging the player to remain at the gaming device for longer time periods, thereby increasing casino profits.

In addition to providing players with supplemental information, casino operators also have found that providing interactive access to the above information enhances the player experience. This type of interactivity allows players significantly more flexibility to make use of the above-described information. Accordingly, components such as touch screens have been developed to provide players with an interactive gaming experience.

Various types of card readers have also been developed for use with gaming devices and networks. Card readers have traditionally been incorporated into gaming devices to enable the use of player club or loyalty cards issued by the casino. In a computerized gaming network, players are able to insert their cards into gaming devices while they play. The casino operator monitors the players' wagering activity (e.g., through its computers) and may provide rewards to players who play sufficiently.

Typically, when a player needs to obtain further cash for wagering, the player must either go to the cash cage, an ATM, or a bank facility. Often there are lines at these locations, and so, in addition to the inconvenience, players often waste a substantial amount of time that they could spend at the gaming device.

BRIEF SUMMARY

Briefly, and in general terms, various embodiments are directed to gaming devices having player interaction systems. The player interaction systems may provide various types of information and services to a player. For example, the information and services may include gaming related information, non-gaming related information, and concierge services. The player is not only provided with this information but may also be able to interact with and select various services and to obtain additional information. Furthermore, the player's interaction with the system may be intuitive and easy to use. Accordingly, the player's gaming experience is enhanced beyond mere playing of the gaming device.

In one embodiment, the gaming system comprises one or more gaming machines, a display system, a player interface system, and a player tracking system. The display system includes a display screen that provides player interactive information. The player interface system includes a keypad and a secondary input means. The player tracking system is in communication with the display system and the player interface system, and the player tracking system includes a card reader for accepting and reading player cards.

In another embodiment, the gaming system comprises one or more gaming machines having a game display for displaying one or more games, a player interaction system, and a player tracking system. The player interaction system includes a transparent LCD screen or the like. The player interaction system further includes a keypad positioned behind the transparent LCD screen, wherein the keypad is visible through the transparent LCD screen. Moreover, the player tracking system is in communication with the player interaction system, and the player tracking system includes a card reader for accepting and reading player cards.

In addition to gaming machines and gaming systems, methods for enhancing player interaction with a gaming machine are disclosed herein. In one method, the gaming machine obtains player information from the player. The gaming machine then displays player services information or game parameters on a display screen. The gaming machine is provided with a keyboard and secondary input means to enable the player to request player services or to modify various game parameters.

In yet another embodiment, a gaming device comprises: a housing; a game display carried by the housing for displaying one or more games; a first card reader carried by the housing and configured to read information indicative of a player identity from a player club card issued by a casino; and a second card reader carried by the housing and configured to read information indicative of a financial account from a financial card issued by a financial institution.

In yet another embodiment, a method of operating a gaming device comprises: receiving a player club card issued by a casino within a first card reader carried by a gaming device; reading information indicative of a player identity from the player club card; while the player club card is positioned within the first card reader, receiving a financial card issued by a financial institution within a second card reader carried by the gaming device; and reading information indicative of a financial account from the financial card.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF EMBODIMENTS OF THE INVENTION

Figure 1:
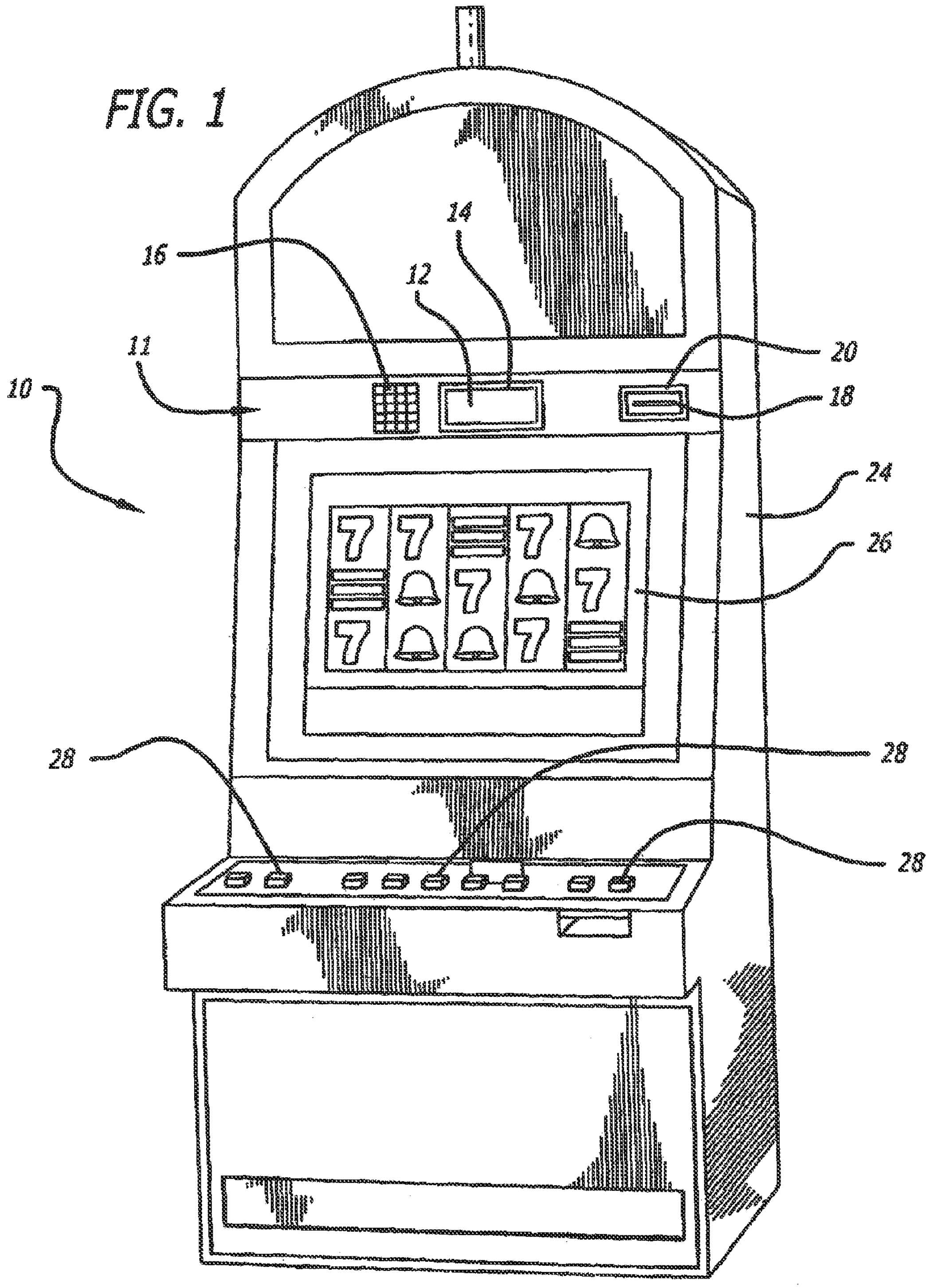
FIG. 1 is an isometric view of one embodiment of a gaming device having a player interaction system.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with gaming devices, networks, integrated circuits, and computing devices have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the embodiments.

Various embodiments disclosed herein are directed to gaming devices having a player interaction system. The player interaction system generally includes a graphics display, a keypad, a secondary input means, and at least one card reader. The player interaction system provides a player-friendly interface for a player to obtain gaming and non-gaming information, to control game play, or to control various functions of the gaming device. Furthermore, the features of the player interaction system may be adapted to or customized by the player. In some embodiments, the player interaction system uses encrypted keypads or other input devices to provide additional levels of security.

Referring now to FIGS. 1-6, there are shown various embodiments of a gaming device having a player interaction system. Specifically, referring to FIG. 1, the gaming device 10 includes a housing or cabinet 24, a game display 26, a plurality of player-activated buttons 28, and a player interaction system 11. The cabinet 24 may be a self-standing unit that is generally rectangular in shape. In other embodiments, the cabinet (not shown) may be a slant-top, bar-top, or table-top style cabinet. However, any shaped housing may be used with embodiments of the gaming device 10.

The game display 26 may present one or more games of chance, such as, but not limited to, mechanical slots, video slots, video keno, video poker, mechanical or video roulette, Class II bingo, lottery, craps, blackjack, a mechanical or video representation of a wheel game, etc. One example game of chance is BLAZING 7's by Bally Technologies, Inc. In other embodiments, the game display 26 may present games of skill or games of chance involving some player skill. In one embodiment, the game display 26 is a CRT or a panel display, such as, but not limited to, liquid crystal, plasma, electroluminescent, vacuum fluorescent, field emission, or any other type of panel display. Additionally, the game display 26 may also include a touch screen or touch glass system.

As shown in FIG. 1, one embodiment of the player interaction system 11 comprises a graphics display 12, a touch bezel 14, a keypad 16, a player card reader 18, and a card reader bezel 20. The graphics display 12 may display any visual screen images (e.g., pictures, characters, symbols) and video images that have been converted for compatibility with digital or computer manipulation, transport and storage. The player interaction system 11 may be positioned above the game display 26, as shown in FIG. 1. Alternatively, the player interaction system 11 may be positioned below or next to the game display 26 or in any other location.

In one embodiment, the graphics display 12 for the player interaction system 11 may comprise a panel display, such as, but not limited to, liquid crystal, plasma, electroluminescent, vacuum fluorescent, field emission, or any other type of panel display. In another embodiment, the graphics display 12 may comprise a transparent LCD display. According to one embodiment, the graphics display 12 is a 320×240 display. In another embodiment, the graphics display 12 is a 640×240 display. However, virtually any size, resolution or type of display may be used in conjunction with the player interaction system 11.

Figure 2:
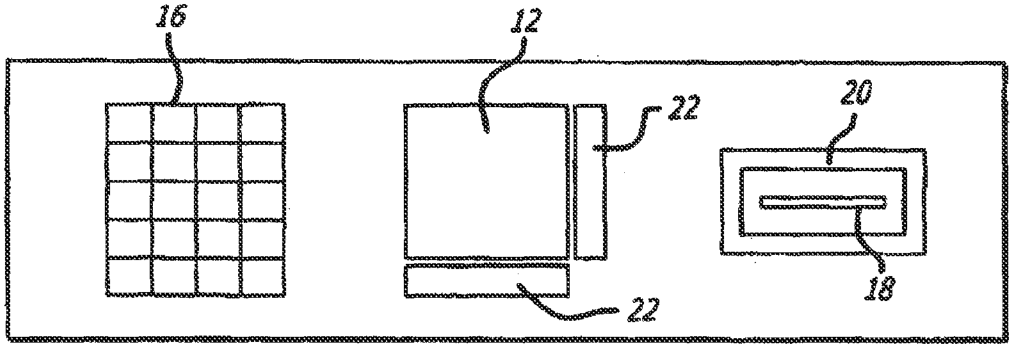
FIG. 2 is a front view of another embodiment of a player interaction system.

In the embodiment shown in FIG. 1, a touch bezel 14 surrounds the graphics display 12. The touch bezel 14 may form a frame surrounding the graphics display 12, where no portion of the touch bezel 14 contacts the graphics display 12. As shown in FIG. 1, the touch bezel 14 is a single component, but the touch bezel 14 may also be made from one or more touch screen or touch glass components (not shown). For example, one or more touch-activated bars may be positioned around the perimeter of the graphics display 12. As shown in FIG. 2, two touch-activated bars 22 are positioned below and to the right of the graphics display 12. In an alternate embodiment, the touch-activated bars 22 may be positioned on opposite sides of the graphics display 12. Any number, combination, or position of the touch-activated bars may be used.

The touch bezel 14 and touch-activated bars 22 may use, for example, either touch screen or touch glass technology to receive and interpret player touches. Various touch types may be used to activate the touch bezel 14 and touch-activated bars 22, such as, but not limited to, taps, drags, double taps, or the like. Alternatively, a stylus or other input means may be used to activate the touch bezel 14 or touch-activated bars 22. The duration and quantity of touches may be used to initiate a function or to make a selection. For example, the touch-activated bars 22 may have scroll-bar functionality. Accordingly, a player may drag his or her finger along the touch-activated bar 22 to scroll down or across a page on the graphics display 12. Alternatively, the touch bezel 14 or touch-activated bar 22 may be touched or tapped at a particular position to designate a particular selection or function that is presented on the graphics display 12. That is, touching or tapping a particular area on the touch bezel 14 or touch-activated bar 22 may activate or select a particular function or selection presented on the graphics display 12. Accordingly, a player can make a selection or navigate around the graphics display 12 based upon the information presented on the display by touching the appropriate region of the touch-activated bar 22.

Referring back to FIG. 1, the player interaction system 11 further includes a keypad 16. The keypad 16 may be configured with a plurality of alphanumeric buttons, numerical buttons, a combination thereof, and the like. The alphanumeric buttons may allow a player to input numbers, alphabetical characters, or symbols. The numerical buttons may allow a player to only input numbers. In one embodiment, the keypad 16 may have a three dimensional aspect that changes to reflect activation. Additionally, the keypad 16 may include one or more dedicated function buttons. The functions may include enter, clear, cancel, yes, no, forward, or back. In one embodiment, the keypad 16 is a secured keypad. That is, once any data (e.g., a personal identification number (PIN) or credit card number) is inputted, the data may be encrypted so that all PIN-related transactions comply with industry standards for credit card and automated teller machine (ATM) transactions. Accordingly, a player may use an ATM, a debit card, or a credit card, in lieu of cash to play a game on the gaming device 10. Alternatively, other cashless technology may similarly be used.

A card reader 18 and a card reader bezel 20 may also be components of the player interaction system 11. The card reader 18 may read magnetic stripe cards. In this regard, the card reader 18 may be used to read player club cards issued by the casino (e.g., player promotional cards, player tracking cards, loyalty program cards), casino employee cards, smart cards, and the like. Additionally, the card reader 18 may be configured to accept and/or read information from financial cards (e.g., credit cards, debit cards, ATM cards, prepaid cards) issued by financial institutions. Generally, the card reader 18 may monitor and track player and employee activity each time a player or employee inserts his or her card into the card reader 18.

As shown in FIG. 1, a lighted card bezel 20 may surround the card reader 18. The bezel 20 may draw attention to the card reader 18 to visually prompt a player and/or employee to insert and/or remove a card. When a player or employee card is inserted into the card reader 18, the bezel 20 may be illuminated with one or more colors, or it may begin flashing. Alternatively, the card reader 18 may not include a lighted card bezel 20. In another embodiment, the player interaction system 11 may include one or more card readers 18. For example, one card reader may be dedicated to receiving financial cards (e.g., credit or ATM cards) issued by financial institutions, and another card reader may be adapted to read information from casino-issued player or employee cards. This embodiment is described in greater detail below with reference to FIGS. 7-15.

Figure 3:
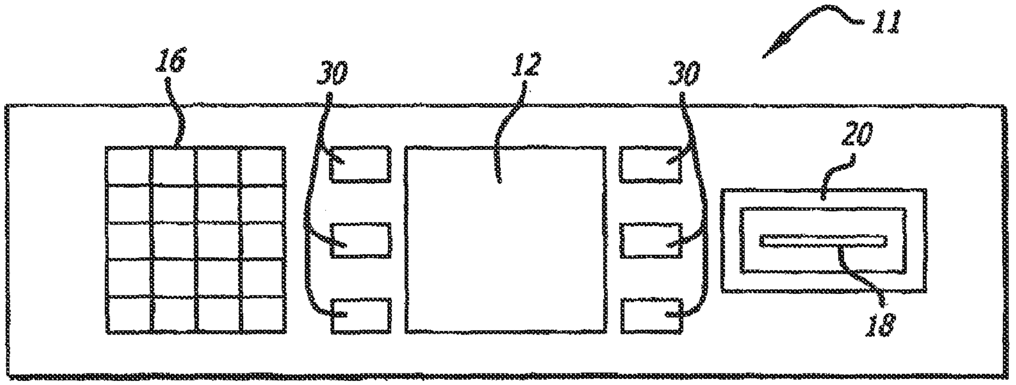
FIG. 3 is a front view of another embodiment of a player interaction system.

FIG. 3 illustrates another embodiment of a player interaction system 11. Like previous embodiments, the player interaction system 11 may include a graphics display 12, a keypad 16, a card reader 18, a card reader bezel 20, and one or more secondary input means. In the embodiment depicted in FIG. 3, the secondary input means include one or more "soft keys." Soft keys 30 may comprise multi-functional keys that use a portion of the graphics display 12 to identify each key's function. As shown in FIG. 3, the six soft keys 30 are physical (i.e., not virtual) buttons that are positioned adjacent to the graphics display 12. In other embodiments, the soft keys 30 may be touch-actuated buttons. As those skilled in the art will appreciate, the number and positioning of the soft keys 30 may be varied from the depiction in FIG. 3.

When compared to soft keys that may be positioned directly on the display (not shown), the soft keys 30 shown in FIG. 3 may be more durable and able to withstand repeated use. Accordingly, these keys 30 may require less maintenance, thereby minimizing service-related costs. Furthermore, the soft keys 30 may provide design flexibility, as each key may have one or more associated functions. For example, the soft keys 30 may have functions, such as, enter, clear, cancel, or continue. The soft keys 30 may be associated with answers, such as "yes," "no," or "maybe." Additionally, the soft keys 30 may have functions that allow a player to navigate between pages shown on the graphics display 12.

Figure 4:
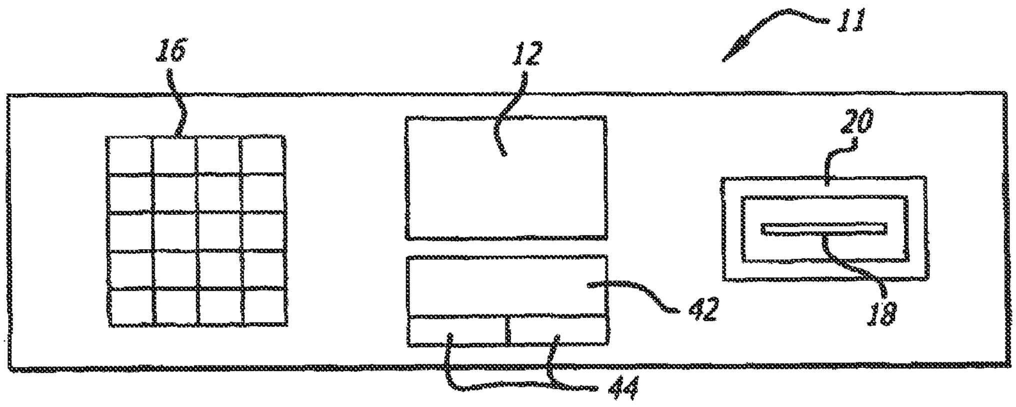
FIG. 4 is a front view of yet another embodiment of a player interaction system.

Referring now to FIG. 4, another embodiment of a player interaction system 11 is shown. Like previous embodiments, the player interaction system 11 may include a graphics display 12, a keypad 16, a card reader 18, a card reader bezel 20, and one or more secondary input means. In this embodiment, the secondary input means includes a touchpad 42. As shown in FIG. 4, the touchpad 42 may comprise a generally rectangular pad including one or more buttons 44. In an alternate embodiment, an annular touchpad (not shown) may be provided in association with the player interaction system 11. Alternatively, the touchpad may not have any buttons. The touchpad 42 may allow a player to navigate around the display 12 with a pointer, scroll through menus, make selections based upon information provided on the display, or input data. Optionally, the buttons 44 may be used in combination with the touchpad 42 to provide the player with additional means of inputting data.

Figure 5A:
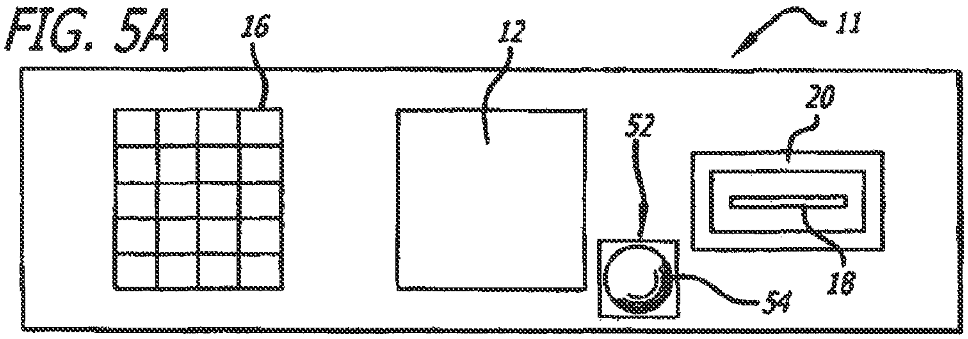
FIG. 5A is a plan view of one embodiment of a player interaction system.
Figure 5B:
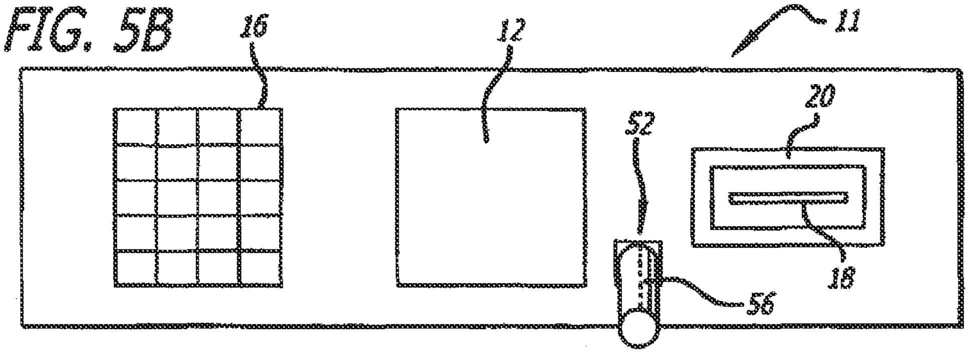
FIG. 5B is a plan view of another embodiment of a player interaction system.
Figure 5C:
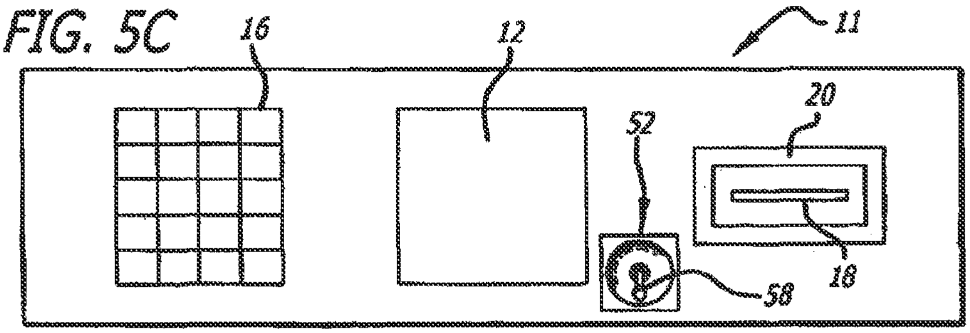
FIG. 5C is a plan view of one embodiment of a player interaction system.

FIGS. 5A-C illustrate other embodiments of player interaction systems 11 using other secondary input devices 52. As shown in FIGS. 5A-5C, the secondary input devices 52 may include a trackball 54, a joystick 56, a microjoystick 58, or any other navigation means. In an alternate embodiment, one or more secondary input devices 52 may be provided in association with the player interaction system 11. The secondary input devices 52 may provide a player with the ability to maximize his or her gaming experience by allowing the player to interact with the gaming device and/or a player services system.

Figure 6:
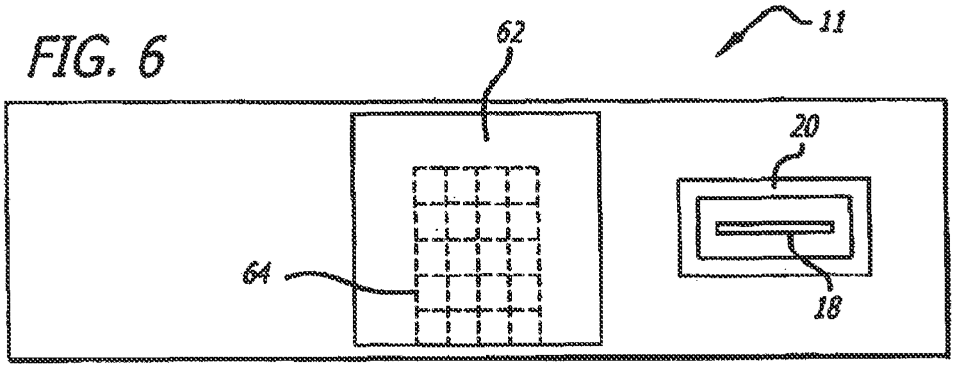
FIG. 6 is a front view of yet another embodiment of a player interaction system.

FIG. 6 illustrates still another embodiment of a player interaction system 11 having a transparent LCD screen 62. Additionally, a keypad 64 may be positioned behind the transparent LCD screen 62. In one embodiment, the keypad 64 is in direct contact with the LCD screen 62. Alternatively, there may be a small amount of space between the keypad 64 and the LCD screen 62. In use, when the area on the LCD screen 62 above a particular key of the keypad 64 is touched, the force of the touch may be transmitted through the LCD screen 62 to activate the key. That is, the screen 62 may have enough flexibility to deflect when depressed to physically contact the key located behind the screen. While the keypad 62 is placed at the bottom of the LCD screen 62 in FIG. 6, the keypad 64 may be placed at any location behind the LCD screen 62. The keypad 64 may have keys for inputting alphanumeric and/or numerical data. In another embodiment, dedicated keys may also be provided with the keypad 64. Additionally, the keypad 64 may be a secured keypad that immediately encrypts the inputted information. In other embodiments (not shown), additional secondary input devices may be included with the player interaction system 11.

The player interaction system 11, as shown in FIG. 6, may also be used to actually play one or more portions of a game presented on the gaming device 10. For example, one or more of the keys may be associated with a game play function, such as initiating the game, initiating a bonus sequence, or the like. In another embodiment, images displayed on the transparent LCD screen 62 may be related to the game and prompt the player to depress one or more keys of the keypad 64. The images displayed on the LCD screen 62 may be displayed on the areas adjacent to the keypad 64 or directly over the keypad. In one embodiment, once a player depresses the key, the inputted information is encrypted to minimize tampering with the game.

In another embodiment, the player interaction system may include a graphics display, a card reader, and one or more secondary input devices. The secondary input devices may be a touch bezel, touch-activated bars, touchpad, trackball, joystick, micro-joystick, or the like. These secondary input devices may provide a player with the ability to maximize his or her gaming experience by allowing the player to interact with the gaming device or a player services system, or to play a game provided by the player interaction system.

One of ordinary skill in the art will appreciate that not all gaming devices 10 will have all these components and may have other components in addition to, or in lieu of, those components mentioned here. Furthermore, while these components are viewed and described separately, various components may be integrated into a single unit in some embodiments.

In addition to the gaming devices disclosed above, various methods for enhancing player interaction with a gaming device may also be provided. According to one method, player information may be obtained from a player club card by reading the information from the card with a card reader 18. The player information may include a player's name, identification number, gaming habits, player rating, or the like. Other player information stored on or associated with a player club card may be related to a player's non-gaming preferences and/or interests, such as, but not limited to, shows, favorite restaurants, favorite foods or drinks, or any combination thereof. Additionally, player information stored on or associated with a player club card may be related to a player's gaming preferences, such as, but not limited to, favorite types of games, speed of game (e.g., fast or slow game play), font size on the game display 26, preferred wager denominations, preferred number of paylines to be played, or a combination thereof. By providing this information on the player club card, the gaming device 10 may be customized to the player's preferences once the player club card has been inserted into the card reader 18, thereby enhancing the player's gaming experience.

In another method, in lieu of inserting a player club card, player information may be input into the gaming device 10 by using the keypad 16 or a secondary input device, such as, but not limited to, the touch bezel 14, touch-activated buttons, touch bar 22, soft keys 30, touchpad 42, annular touchpad, touchpad buttons 44, trackball, joystick, micro-joystick, or other input devices. The information inputted by the player may include the player's name, a casino-issued player identification number, a driver's license number or the like. This information may then be transmitted to a host network (e.g., a player tracking network (not shown)) to access the player's profile stored on the network. Accordingly, the network may transmit the player's name, player rating, and other preferences to the gaming device 10.

Once the player information has been received, a prompt or acknowledgement may be displayed on the graphics display 12. For example, player information such as the player name and/or player rating may be displayed on the graphics display 12. The graphics display 12 may also display advertisements, player services information, gaming-related information, system gaming, and game parameters for the game displayed on the gaming device 10. For example, player services information may pertain to casino promotions, show times, restaurant choices, or hotel specials. The gaming-related information may include, for example, information on sports betting and various betting options for those sporting events. For example, the gaming-related information may include information relating to horse racing and/or off-track betting. Alternatively, the information provided on the graphics display 12 may be non-gaming-related information, such as, but not limited to, local or world news. System gaming relates to games that may be presented by the player interaction system 11 on the graphics display 12. The game parameters provided by the player interaction system 11 and presented on the graphics display 12 may include speed of game (e.g., fast or slow game play), font size on the game display 26, wager denomination, number of paylines to be played, or any combination thereof.

In one method, this information is presented on the graphics display 12 whether or not a player is identified by a player club card or by information input by a player. That is, a casino operator may determine a default list of services to be provided via the player interaction system 11. In another method, the player services information and/or other information displayed on the graphics display 12 may be accessed or modified when the player accesses a series of menus or answers particular questions as prompted by the player interaction system 11. In another method, the information provided on the graphics display 12 is customized according to a player's predetermined preferences.

The various types of information presented on the graphics display 12 may be stored locally in the gaming device 10. Alternatively, the information presented on the graphics display 12 may be stored in a remote location such as a central server. In yet another embodiment, multiple remote sources may store the information presented on the graphics display 12.

The player services information, gaming-related information, non-gaming information, and game parameters displayed on the graphics display 12 may be associated with secondary input devices. For example, a soft key 30 may correspond to a "game parameter." Once the player actuates the soft key 30 associated with the "game parameter," another series of game parameter options may appear on the graphics display 12, and these game parameter options may also have associated soft keys. For example, one soft key 30 may correspond to game instructions. When a player actuates the associated soft key 30, the game instructions, rules, and, optionally, a pay table may be displayed on the graphics display 12. In another embodiment, player services information, gaming and non-gaming-related information may be displayed on the graphics display 12 as links or hyperlinks, and a pointer may be used to select the particular information or service desired. The pointer may be controlled by using a secondary input device such as a trackball, joystick, micro-joystick, touchpad, or the like.

Accordingly, the player's gaming experience may be enhanced by allowing the player to interact with information provided by the player interaction system 11 on the graphics display 12. The player may have the ability to obtain as much additional information as he/she desires. Furthermore, the player may interact with the information provided on the player interaction system 11 and customize the game he/she is playing. Moreover, the player's gaming experience may be enhanced as the player may be able to order a drink, make dinner or show reservations, redeem a coupon, all without leaving the gaming device 10. Players may also be less fatigued and enjoy their gaming experience more because they can customize various game parameters by inputting their selections using familiar input devices (e.g., the keypad 16 and/or the one or more secondary input devices).

In an alternate embodiment, a cellular phone or other input device (e.g., PDA), separate and apart from the gaming device 10 may also be used to input various player choices and information to enhance the player's interactive experience with the gaming device 10. Furthermore, inputting information via these devices may provide an added level of security, as any key presses may be hidden from view. In yet another embodiment, a player may call or send a short message service (SMS) text to the gaming device 10 to input player choices and information.

In one embodiment, the gaming device 10 may include two card readers, for example, as part of a player interaction system. The two card readers may be configured as one dual integrated card reader, although they may comprise separate components in other embodiments. The player interaction system, together with the two card readers, may provide an interface for a player to obtain gaming and non-gaming information, control game play, control various functions of the gaming device 10, access and perform transactions with the player's casino account and/or conduct financial transactions with bank or credit card accounts. In some embodiments, the player interaction system may use encrypted keypads or other input devices to provide additional levels of security, as described above.

Figure 7:
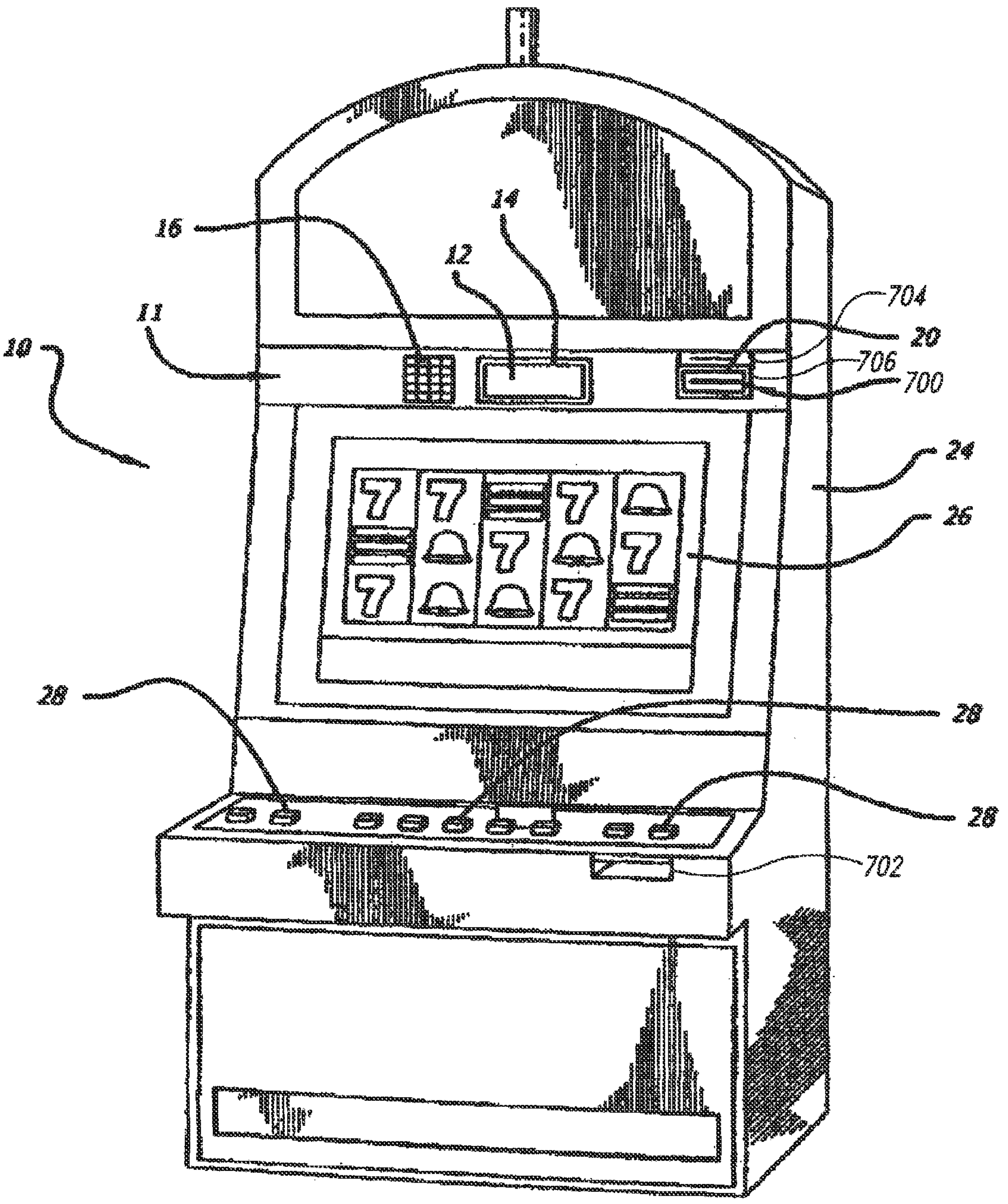
FIG. 7 is an isometric view of an example gaming device having two card readers, in accordance with one embodiment.

Referring to FIG. 7, an example gaming device 10 is shown that includes a housing or cabinet 24, a primary game display 26, player-activated buttons 28, a player interaction system 11 with a dual card reader 700, a bill/voucher acceptor 702 and one or more speakers (not shown). As described in greater detail below, the illustrated dual card reader 700 comprises a financial card reader 704 and a player club card reader 706.

Many of the gaming device components may be configured similarly to the components with identical reference numerals described above. In one embodiment, a cabinet 24 may house a processor, various electronic components and circuitry including memory, and software for receiving signals from the player-activated buttons 28, operating the games, and transmitting signals to the respective displays and speakers. Cabinet 24 may optionally include a top box (not shown) which may include yet another display to provide advertising or payout information related to the game or additional games available on gaming device 10.

In one embodiment, the player-activated buttons 28 may be replaced with other input devices, such as, but not limited to, a touch screen system, touch pad, track ball, mouse, switches, or toggle switches. For example, one potential input device is a universal button module as disclosed in U.S. patent application Ser. No. 11/106,212, entitled "Universal Button Module," filed on Apr. 14, 2005, which is hereby incorporated by reference in its entirety. The universal button module may provide a dynamic button system adaptable for use with various games and capable of adjusting to gaming devices having frequent game changes.

The game display 26 and/or the graphics display 12 may present various types of information to a player, such as, but not limited to, player information, advertisements and casino promotions, graphic displays, news and sports updates, or even alternate games. This information may be generated by a host computer networked with the gaming device 10 or by the gaming device 10 itself, and may be generated upon request by the player or independent of the player's requests.

One or more embodiments of the gaming device 10 may further include buttons (not shown) disposed about the graphics display 12 that enable a player to make selections, where legends on the screen (as on an ATM machine's screen) are associated with respective buttons. Alternatively, if the graphics display 12 comprises a touch screen or similar technology, then a player may press the display 12 itself or any other player input device that offers similar functionality.

The housing 24 may incorporate a single game display 26 as illustrated. However, in alternative embodiments, the housing 24 may carry one or more additional game displays or components used for various purposes, including additional game play screens, animated "top glass," progressive meters or mechanical or electromechanical devices such as, but not limited to, wheels, pointers or reels. The additional game displays may or may not include a touch screen or touch glass system.

As illustrated in FIG. 7, the gaming device 10 includes two card readers 704, 706 integrated into a dual card reader 700. The financial card reader 704, located above the player club card reader 706, may comprise a swipe-type card reader for sliding a financial card issued by a financial institution, such as a bank, debit or credit card. The financial card reader 704 may be configured to read information from the financial card indicative of a player's financial account. In one embodiment, the financial card reader 704 includes an open frame for receiving the financial card and at least one sensor for detecting information from the financial card's magnetic strip. For example, in one embodiment, the at least one sensor may comprise a magnetic pickup for detecting the information.

In other embodiments, the financial card reader 704 may comprise any other style card reader for reading information from a financial card. For example, the financial card reader 704 may comprise a full- or half-insertion card reader that receives the financial card fully or partially within the financial card reader 704. In another embodiment, the financial card reader 704 may comprise a radio frequency (RF) interrogator configured to read information from the financial card when it is positioned close to the financial card reader 704. Although the embodiments are generally described in the context of a financial card having a magnetic strip, any of a variety of cards capable of storing and providing access to data may be used (e.g., cards having smart chips, bar codes, RF transceivers, etc.).

As illustrated, the player club card reader 706 may comprise a half-insertion type card reader for accepting a player club card issued by the casino. The player club card reader 706 may be configured to read information from the player club card indicative of a player's identity (e.g., information indicative of the player's account at the casino). The player club card reader 706 may also accept other types of computer-readable cards, such as employee cards issued by the casino, discount or coupon cards issued by the casino, etc. In one embodiment, the player club card reader 706 includes a receptacle for accepting a player club card and at least one sensor for detecting information from the player club card's magnetic strip. For example, in one embodiment, the player club card reader 706 may include a magnetic pickup for detecting information from the player club card's magnetic strip.

In other embodiments, the player club card reader 706 may comprise any other style card reader for reading information from the player club card. For example, the player club card reader 706 may comprise a full-insertion card reader into which the player club card may be fully inserted or a swipe-type card reader configured similarly to the financial card reader 704. In another embodiment, the player club card reader 706 may comprise a radio frequency (RF) interrogator configured to read information from the player club card when it is positioned close to the player club card reader 706. Although the embodiments are generally described in the context of a player club card having a magnetic strip, any of a variety of cards capable of storing and providing access to data may be used (e.g., cards having smart chips, bar codes, iButtons, RF transceivers, etc.).

In the illustrated embodiment, the financial card reader 704 and the player club card reader 706 are integrated into the dual card reader 700. As discussed below, this integration may enable the two card readers 704, 706 to share certain components (e.g., controller circuitry) and may allow the two card readers 704, 706 to take up less room at the front of the gaming device 10 than would otherwise be possible. Of course, in other embodiments, the two card readers may comprise completely separate components and may be separately disposed on the gaming device 10.

Although the dual card reader 700 is illustrated as part of the player interaction system 11, the financial card reader 704 and the player club card reader 706 may be located anywhere on the gaming device 10. In one embodiment, for example, the financial card reader 704 may be located adjacent the bill/voucher acceptor 702, while the player club card reader 706 is positioned in the player interaction system 11.

Figure 8:
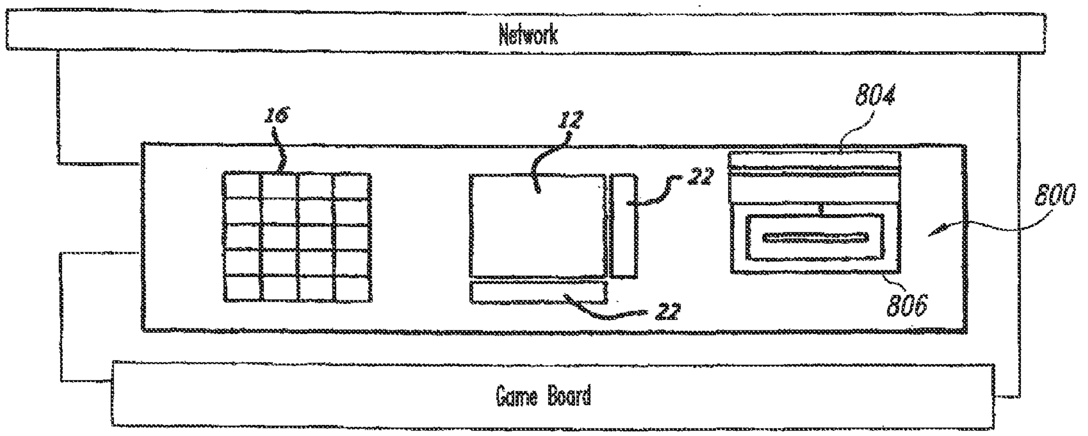
FIG. 8 is a plan view of a player interaction system including two card readers, in accordance with one embodiment.
Figure 9:
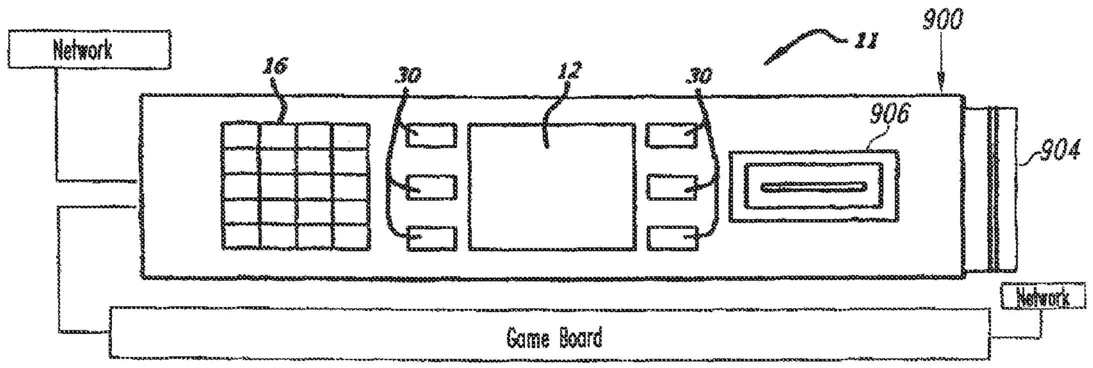
FIG. 9 is a plan view of another player interaction system including two card readers, in accordance with one embodiment.
Figure 10:
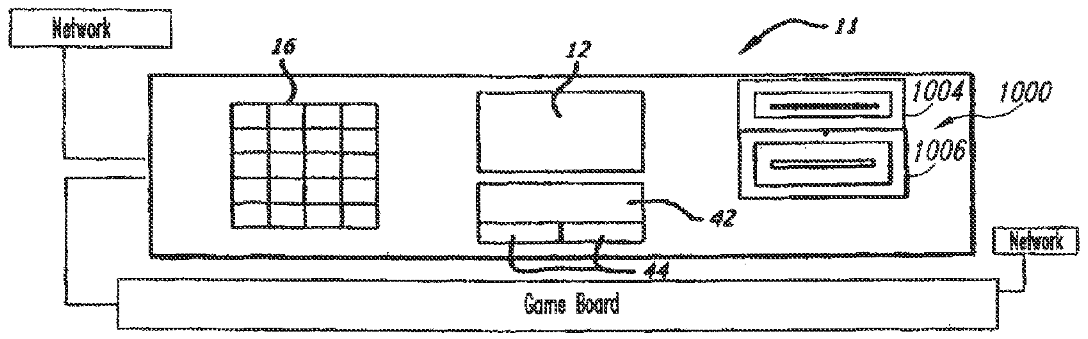
FIG. 10 is a plan view of yet another player interaction system including two card readers, in accordance with one embodiment.

Referring to FIGS. 8, 9 and 10, several illustrative example player interaction systems 11, which generally correspond to those originally presented in FIGS. 2, 3 and 4, are shown with multiple card readers.

Referring to FIG. 8, an example player interaction system 11 is shown with a keypad 16, a graphics display 12, two touch-activated bars 22 positioned below and to the right of the graphics display 12, and a dual card reader 800. The dual card reader 800 of FIG. 8 is configured similarly to the dual card reader 700 of FIG. 7 and may include a financial card reader 804 and a player club card reader 806, each connected either directly or indirectly to a controller board (not shown), a game controller board, and/or a network. The network in turn may couple the gaming device 10 to various components and devices within the casino.

In other embodiments, the various components of the player interaction system 11 may be positioned and configured differently. Additionally, particular components may be combined. For example, keypad 16 may be implemented as part of graphics display 12, where graphics display 12 functions as a touch screen.

Indicator lights (not shown) may also surround the dual card reader 800. Indicator lights used on single card readers, such as that found on the S9000 with iView made by Bally Technologies, Inc., may be modified to surround the dual card reader 800. The indicator lights may draw attention to the respective card readers 804, 806 and visually prompt a player to insert and/or remove his or her card. When a player's card is inserted into one of the card readers 804, 806, the indicator lights may be illuminated with one or more colors, or they may begin flashing.

In one embodiment, as an alternative or addition to dedicated indicator lights, the graphics display 12 may display a message when a card is inserted into either of the two card readers 804, 806. The graphics display 12 may show, for example, a figure representing the dual card reader 800 and highlight the individual card reader that is being utilized. This figure may last for a short period of time, and then the graphics display 12 may display some other image. One or more of the images shown on the graphics display 12 may be interactive if the graphics display 12 includes touch screen capability (e.g., allowing a player to enter a PIN associated with an ATM card).

As illustrated in FIG. 8, the financial card reader 804 comprises a swipe card reader including a horizontal slot for receiving a financial card. The player club card reader 806, located below the financial card reader, may comprise a half-insertion type card reader including a receptacle for receiving a player club card. In one embodiment, the financial card reader 804 may be at least partially integrated with the player club card reader 806, such that a communication path from the financial card reader 804 may pass through the player club card reader 806 to a shared controller (not shown). The shared controller may run software or firmware capable of discriminating between different types of cards inserted into either of the card readers 804, 806 and capable of communicating with either card reader 804, 806. Thus, the footprint of dual card reader 800 as seen from the front of the gaming device 10 may be similar to a footprint of a single card reader. In addition, the volume required by the dual card reader 800 behind the face of the player interaction system 11 may also be similar to that required by a single card reader.

FIG. 9 illustrates another embodiment of a player interaction system 11, including another dual card reader 900. In this embodiment, the player club card reader 906 is located in roughly the same location as that illustrated in FIG. 8, while the financial card reader 904 is positioned on the side of the player interaction system 11. The two card readers 904, 906 comprise one dual card reader 900, as they share a controller (not shown). For example, in one embodiment, the financial card reader 904 and the player club card reader 906 may each be associated with a communication path (e.g., a cable or direct connection) to a shared controller.

Referring now to FIG. 10, yet another embodiment of a player interaction system 11 is shown including a dual card reader 1000. In this embodiment, the dual card reader 1000 comprises two insertion-type card readers, a financial card reader 1004 and a player club card reader 1006. A visual display adjacent the dual card reader 1000 (not shown) may indicate the type of card to insert within the respective card readers 1004, 1006. Although the insertion slots for the dual card reader 1000 are shown horizontally, they may also be disposed vertically in other embodiments.

In an alternative embodiment, both of the insertion-type card readers 1004, 1006 may accept either a player club card, technician card, or financial card. Upon insertion of any type of card, a controller associated with one or more of the card readers 1004, 1006 may determine the type of card based on information received from a card reader and then appropriately read and process the information encoded on the card. Thus, in one embodiment, a player need not determine which card reader 1004, 1006 should be used for which of his or her cards.

A controller shared by the financial card reader 1004 and the player club card reader 1006 may be sandwiched between the two to enable a direct connection (e.g., by soldering). The card readers 1004, 1006 may also be removably connected to the controller, for example, by a USB or Ethernet connection or by a parallel connection.

Figure 11A:
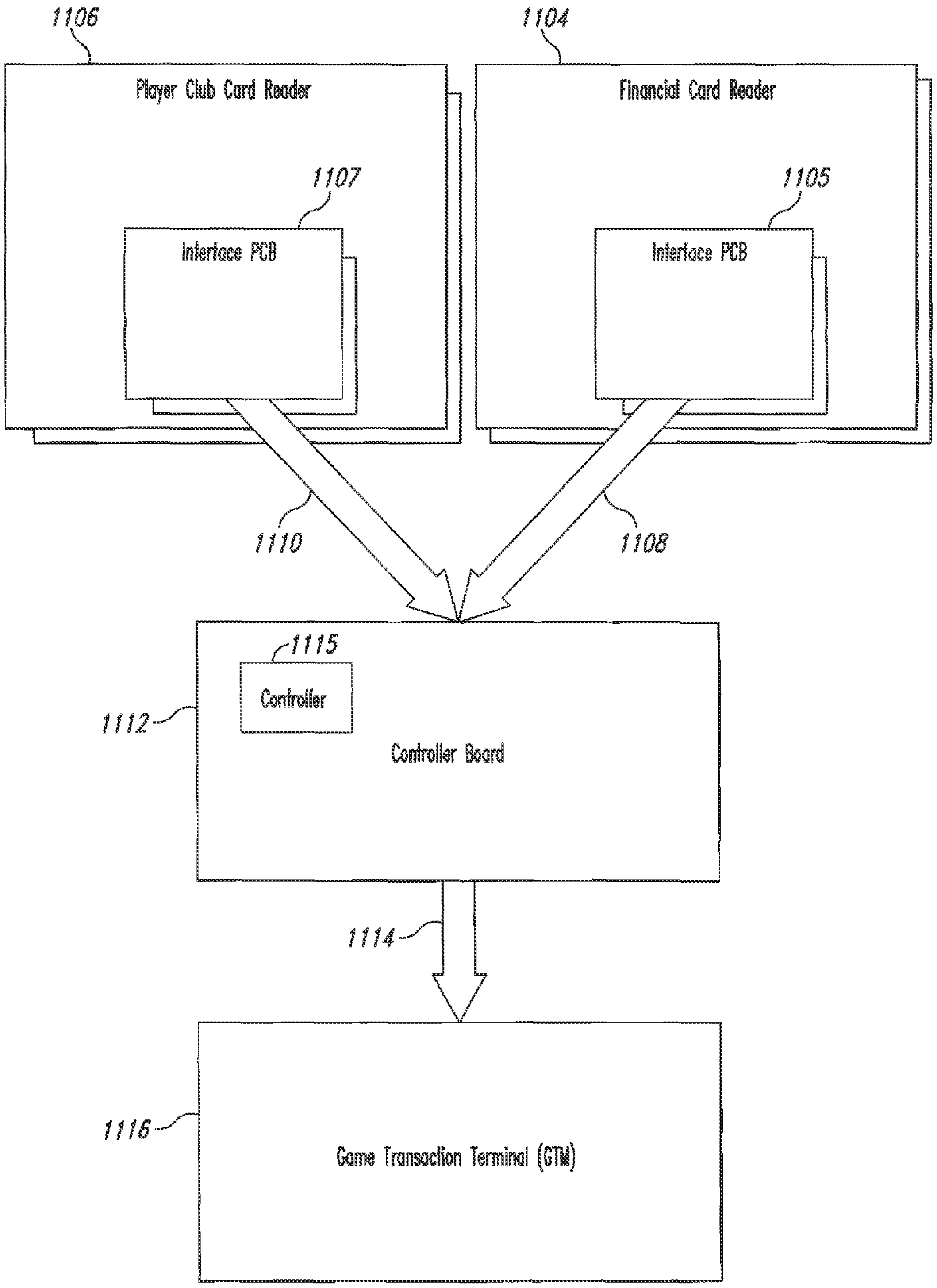
FIG. 11A is a flow diagram for an example gaming device having two card readers, in accordance with one embodiment.
Figure 11B:
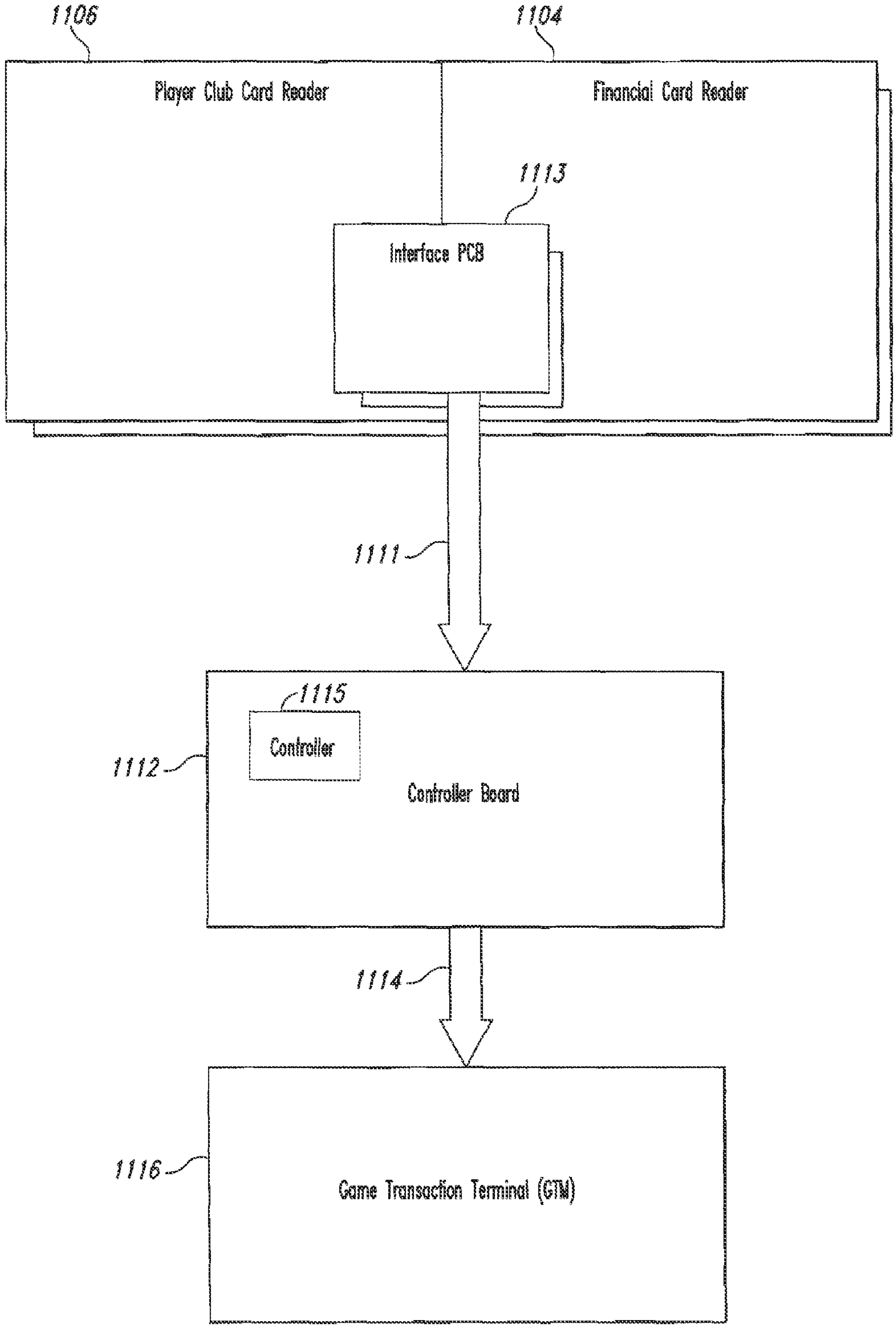
FIG. 11B is a flow diagram for another example gaming device having two card readers, in accordance with one embodiment.

Referring to FIG. 11A, an example system flow diagram shows two card readers 1104, 1106 independently coupled through communication paths 1108, 1110 to a controller board 1112 (which includes a shared controller), which in turn may be coupled through a communication path 1114 to a game transaction terminal 1116. Referring to FIG. 11B, many of the components are similar; however, the two card readers 1104, 1106 may be jointly coupled through a single communication path 1111 to the controller board 1112.

The player club card reader 1106 may include a frame for receipt of more or less half a card, such as a player club card with a magnetic strip, and may further include a magnetic pickup for detecting information from the card's magnetic strip. The player club card reader 1106 may further include front and rear detectors for detecting the presence of a player club card within the player club card reader 1106. For example, the front and rear detectors may comprise optical or contact detectors that are triggered by the presence of the player club card. In one embodiment, the player club card reader 1106 may be configured similarly to the Neuron MCR-330T found on the S9000 series slot machines made by Bally Technologies, Inc. In other embodiments, the player club card reader may be configured in any of a variety of ways.

As illustrated in FIG. 11A, the player club card reader 1106 may further include an interface printed circuit board (PCB) 1107 that processes signals from the magnetic pickup, as well as from the forward and rearward detectors, and forwards information representative of these signals on to the controller board 1112. In another embodiment (shown in FIG. 11B), the player club card reader 1106 may share an interface PCB 1113 with the financial card reader 1104. In this embodiment, the shared interface PCB 1113 may process and forward inputs from the player club card reader 1106 and the financial card reader 1104 on to the controller board 1112.

The financial card reader 1104 may include an open frame, such as a U-slot, for sliding a card, such as a bank, debit or credit card, and may further include a sensor (such as a magnetic pickup) for detecting information from the card's magnetic strip. As in the player club card reader 1106, the financial card reader 1104 may further include at least one detector for detecting the presence of a financial card within the financial card reader 1104. Similar card readers may be found at grocery, sundry, department, and many other types of stores.

The financial card reader 1104 may also include an interface PCB 1105 that processes signals from associated sensors and detectors and forwards information representative of these signals on to the controller board 1112. This interface PCB 1105 may be a separate component of the financial card reader 1104 (as illustrated in FIG. 11A) or may be shared with the player club card reader 1106 (as illustrated in FIG. 11B).

Any card reader may be utilized interchangeably in the design of the respective individual card readers 1104, 1106. For example, in one embodiment, both card readers 1104, 1106 may comprise swipe card readers.

In one example implementation, a half-insertion type card reader may be modified to include a swipe card reader having a second magnetic sensor for reading another card. The swipe card reader may be oriented horizontally, so that a card (e.g., a financial card) may be read by swiping it left-to-right or right-to-left. In another example, the swipe card reader may be oriented vertically for swiping a financial card up-to-down or down-to-up.

Communication paths 1108, 1110, 1111 and 1114 may comprise conventional cabling connecting to respective ports of the controller board 1112. For example, Ethernet or USB cables may connect to Ethernet or USB ports. In one embodiment, other serial or parallel communications cables may be utilized. In yet another embodiment, a sensor and/or interface PCB of one of the card readers 1104, 1106 may include a portion that is soldered or directly implemented on the controller board 1112.

In one embodiment, the controller board 1112 may comprise a printed circuit board (PCB) including a controller 1115 and memory. The controller 1115 may be a digital signal processor, such as those manufactured by Motorola or Texas Instruments, or may be a microprocessor. The memory may comprise onboard memory, such as conventional RAM and/or ROM, and may be non-volatile or volatile. In one embodiment, the memory may store drivers for supporting communication via communication paths 1108, 1110, 1111 and 1114. The memory may also store instruction sets, procedures and/or routines that may be executed on the controller 1115 when a card is inserted into either of the two card readers 1104, 1106. Depending upon the type of card inserted, the controller 1115 may also send a query to the player (e.g., via the graphics display 12) asking for more information, such as a PIN, or the controller 1115 may pass identifying information on to another device for further processing.

In one embodiment, the controller 1115 may be configured to collect player identity information from the player club card reader and financial account information from the financial card reader. The controller 1115 may then process such information as described in detail with respect to FIG. 12. In another embodiment, the controller 1115 may be further configured to detect the insertion of a card, and to recognize the type of card inserted before collecting information therefrom.

In an example implementation, a controller board (such as that included in an individual card reader assembly) may be modified to include additional read electronics for a second sensor and interface PCB.

The controller 1115 on controller board 1112 may also control lights adjacent the card readers 1104, 1106 that represent card insertion statuses, such as a constant green light if a card has been inserted properly or a flashing red light if a card has not been inserted properly. Alternatively or in addition, the controller 1115 may transmit messages, such as text, picture, audio or video messages, to a player.

In one embodiment, the financial card reader 1104 may also accept a technician's card identifiable by the controller board 1112, while a player has a player club card inserted in the player club card reader 1106 or when there is no other card present. Upon recognizing the technician's card, the controller board 1112 may provide access to machine diagnostic functions, which may be accessed directly by the controller 1115 or which may be accessed via a gaming device board (not shown) communicatively coupled to the controller board 1112.

The communication path 1114 may connect the controller board 1112 with a game transaction terminal (GTM) 1116, such as a game monitoring unit (GMU). Communication path 1114 may comprise conventional cabling as described above. In one embodiment, the controller board 1112 and GTM 1116 may be implemented on the same PCB. GTM 1116, in turn, may communicate with a gaming device board that controls a game of the gaming device 10, or may communicate with a networked server, for example a player account server or a financial card server.

Figure 12:
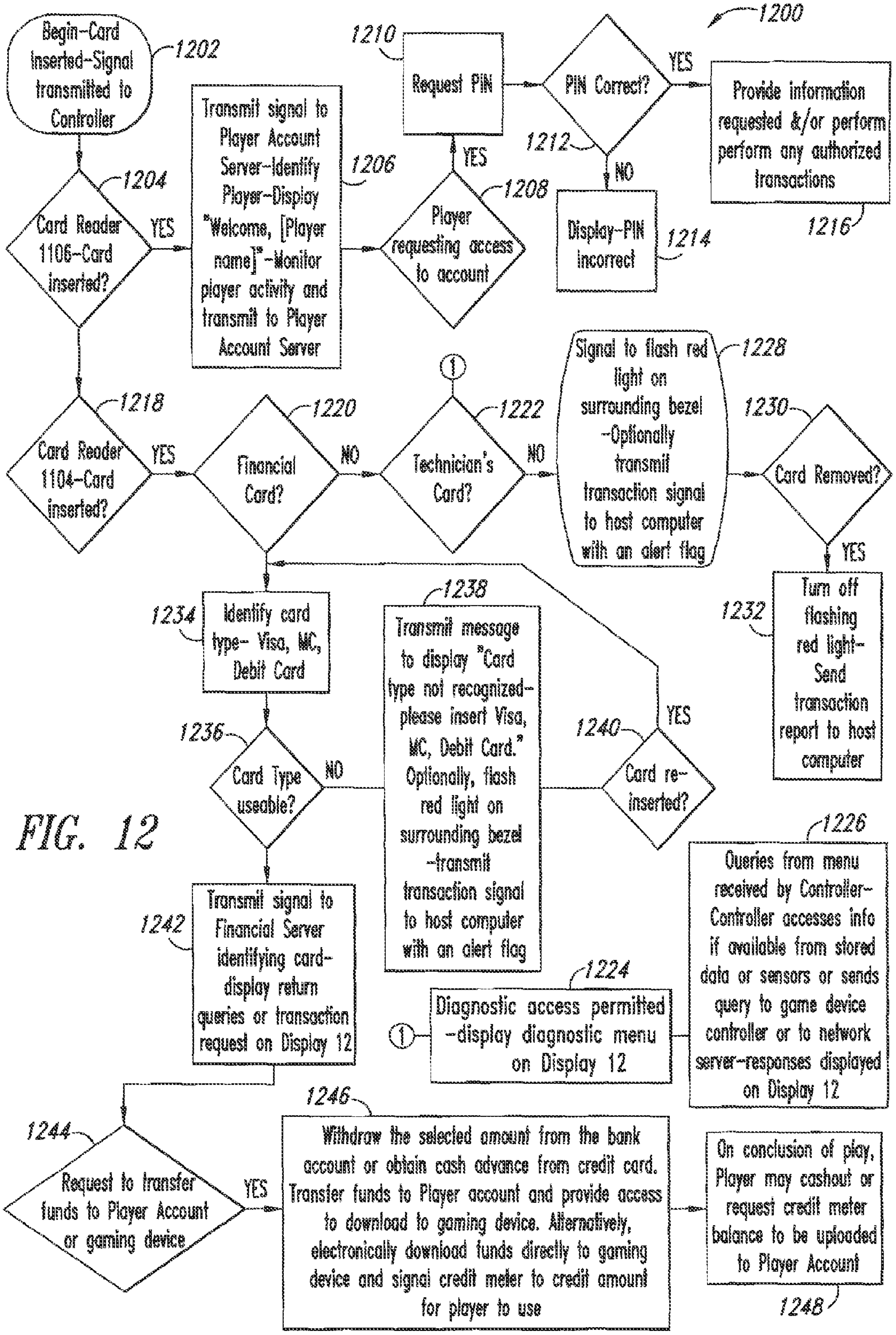
FIG. 12 is a flowchart illustrating steps in an example partial program for controlling two card readers, in accordance with one embodiment.

Referring to FIG. 12, a flowchart illustrates an example partial program 1200 for controlling two card readers, which may be executed by the controller 1115 on controller board 1112. In one embodiment, the program 1200 may be stored in executable, object or source code form on the controller board 1112 or on other memory accessible by the controller 1115. FIG. 12 shows several partial sequences of events, which may cause further steps to be taken by the controller 1115 and which may provide for player interaction utilizing the graphics display, keypad, and any other secondary input devices.

In one embodiment, at 1202, one of the card readers transmits an initial signal to the controller 1115 when a card is inserted. The card may be fully or half-way inserted, slid in and out, swiped through a slot, or otherwise positioned to interact with a detector that indicates the presence of a card. The controller 1115 may then receive information read by a sensor associated with a respective card reader and temporarily store the information. The information may be segmented and may include identifiable field segments, which may then be used by the controller 1115 to identify a card type and other information about the player.

In one embodiment, at 1204, the controller 1115 may determine that a player club card has been inserted into the player club card reader 1106, and, based at least in part on this determination, the controller 1115 may process the other information encoded on the player club card as described below. For example, a player club card may have an identifier of '0001' in an initial field. After identifying the inserted card as a player club card, the controller 1115 may then inspect a next field that includes a unique player account number.

At 1206, the player account number may be used to identify the player, and a welcome message may be sent by the controller 1115 to the graphics display 12 with the player's name and additional information, such as the player's account status. As the player plays on the gaming device 10, information about the game play and other player activity may be monitored by the controller 1115, which in turn may either store the information or transmit the information elsewhere, such as through GTM 1116 to a player account server at the casino for storage and/or for updating a player database.

In the event that the controller 1115 is able to connect to a player account server associated with the casino, which may include a player database, the player may be able to access records concerning the player's account, including any credits, such as promotional or other credits, which may be available for play. In one embodiment, as shown at 1208, the player may request access to such player account information. At 1210, in order to provide enhanced security, the controller 1115 may request a PIN prior to providing access to the player account information or prior to allowing the player to transfer credits to the gaming device 10.

Upon entry of the PIN via an input device, the controller 1115 may evaluate the PIN at 1212. If the PIN is incorrect, at 1214, the controller 1115 may cause the graphics display 12 to show a message indicating the entry of an incorrect PIN. If the PIN is correctly entered, at 1216, the controller 1115 may provide access to the player's account information and/or perform transactions requested by the player.

Continuing through FIG. 12, a similar process may be carried out if, at 1218, the controller 1115 determines that a card has been inserted into the financial card reader 1104. In one embodiment, the use of two card readers 1104, 1106 may enable the gaming device 10 to receive a financial card within the financial card reader at the same time that a player club card is positioned within the player club card reader. Thus, by using two card readers 1104, 1106, neither card need be removed in order to collect information from the other card.

When a financial card has been detected, information from the financial card may be sensed and received as a number of identifiable field segments. In one embodiment, an initial field may have a length of 2-16 bits and may identify the type of card inserted into the financial card reader 1104. For example, at 1220, the controller 1115 may determine based on the initial field whether or not the inserted card is a bank or credit card.

In one embodiment, the financial card reader 1104 may be further configured to accept the cards used by technicians in the casino to access certain functionality of the gaming device 10. In such an embodiment, if it is determined that the inserted card is not a bank or credit card, then, at 1222, the controller 1115 may determine whether or not the inserted card is a technician's card. If the technician's card is recognized by the controller 1115, diagnostic access to the gaming device 10 may be permitted at 1224 based at least in part on the information read from the technician's card. For example, in one embodiment, a diagnostic menu may be displayed on the graphics display 12.

At 1226, the controller 1115 may be further configured to respond to diagnostic queries made by the technician, routing them to the appropriate circuitry (e.g., the gaming device board) or to an appropriate network server for response. In other embodiments, once a technician's card has been recognized by the controller 1115, varying levels of access may be provided to the technician, and the access may be controlled by different circuitry within the gaming device 10.

At 1228, if the controller 1115 has not recognized the card inserted into the financial card reader 1104 as either a financial card or a technician's card, the controller 1115 may provide a visual and/or audible indication that an incorrect card has been inserted. For example, in one embodiment, an indicator light adjacent the financial card reader 1104 may be signaled to flash red. In another embodiment, a signal may be sent from the gaming device 10 to a host computer with an alert indicating that someone has inserted an unrecognized card into the gaming device 10. In one embodiment, the host computer may reside in a security office within the casino and may be used to monitor attempted fraud. In another embodiment, the host computer may signal personnel within the casino to assist someone at the gaming device 10 with the correct insertion of a financial card.

At 1230, the controller 1115 may wait for the unrecognized card to be removed from the financial card reader 1104. Once it is removed, at 1232, the controller 1115 may stop the visual and/or audible indication. In one embodiment, the gaming device 10 may signal the host computer that the unrecognized card has been removed.

As another example, the controller 1115 may instead determine at 1220 that a financial card has been inserted, and, based at least in part on this determination, the controller 1115 may process the information encoded on the financial card as described below. At 1234, the controller 1115 may use the initial field or a subsequent field to identify the card type (e.g., VISA, MASTERCARD, AMERICAN EXPRESS, DISCOVER, debit card, etc.). If the card type is not useable (e.g., the card is not a permitted credit card or is unreadable), at 1236, then the controller 1115 may display an appropriate message on the graphics display 12. For example, the message may indicate that the casino does not accept a particular credit card type or may indicate that the card type was not registered. In another embodiment, an indicator light adjacent the financial card reader 1104 may be signaled to flash red, and, in yet another embodiment, a signal may be sent from the gaming device 10 to a host computer with an alert indicating that someone has inserted a financial card into the gaming device 10 that is not useable. At 1240, the controller 1115 may then wait for a new financial card to be inserted and loop back to recognition of the type of financial card at 1234.

If, on the other hand, the financial card is useable, then, at 1242, the controller 1115 may send a signal to a financial server communicatively coupled to the gaming device 10 identifying the card. In one embodiment, the controller 1115 may receive a request from the financial server for a PIN and may then forward that request on to the player via the graphics display 12. In another embodiment, the controller 1115 may recognize the card as a debit card and automatically request a PIN from the player before receiving a request from the financial server for the PIN. In yet another embodiment, the controller 1115 may also compare player identity information associated with a player club card within the gaming device 10 against identifying information associated with the financial card (and corresponding financial account). Thus, even if a player enters the correct PIN, access to funds may be denied by the gaming device 10 if the two forms of identification do not match. In another embodiment, only certain gaming device functionality may be enabled if the identities associated with the player club card and the financial card do not match.

Once the PIN has been received by the controller 1115, authentication of the player may proceed in any of a number of ways. In one embodiment, the controller 1115 may receive a PIN from the player and a PIN from the financial server and may authenticate the player at the gaming device 10. In another embodiment, the controller 1115 may receive the PIN from the player and forward the PIN (e.g., in encrypted form) to the financial server for authentication.

Once the player has been authenticated, the player may then request services relating to the player's account at a financial institution associated with the inserted financial card. In one embodiment, at 1244, the player may request that funds be transferred from the financial institution to the player's account at the casino or to the gaming device 10 for immediate play. In one embodiment, for example, the player may have a player club card inserted simultaneously into the player club card reader 1106, and the player may request that funds be transferred from the financial institution to a player account associated with the player club card.

At 1246, an advance from a credit card or an amount of cash from a bank account may be transferred in accordance with the player's request and may be accessed via the player's account at the casino or at the gaming device 10. Such funds may then be used to wager at the gaming device 10.

Finally, at 1248, at the conclusion of play, the player may cashout or request that a balance reflected on the gaming device 10 be transferred to the player's account at the casino, be transferred directly to the player's account at the financial institution, or be withdrawn as cash or a cash voucher.

Figure 13:
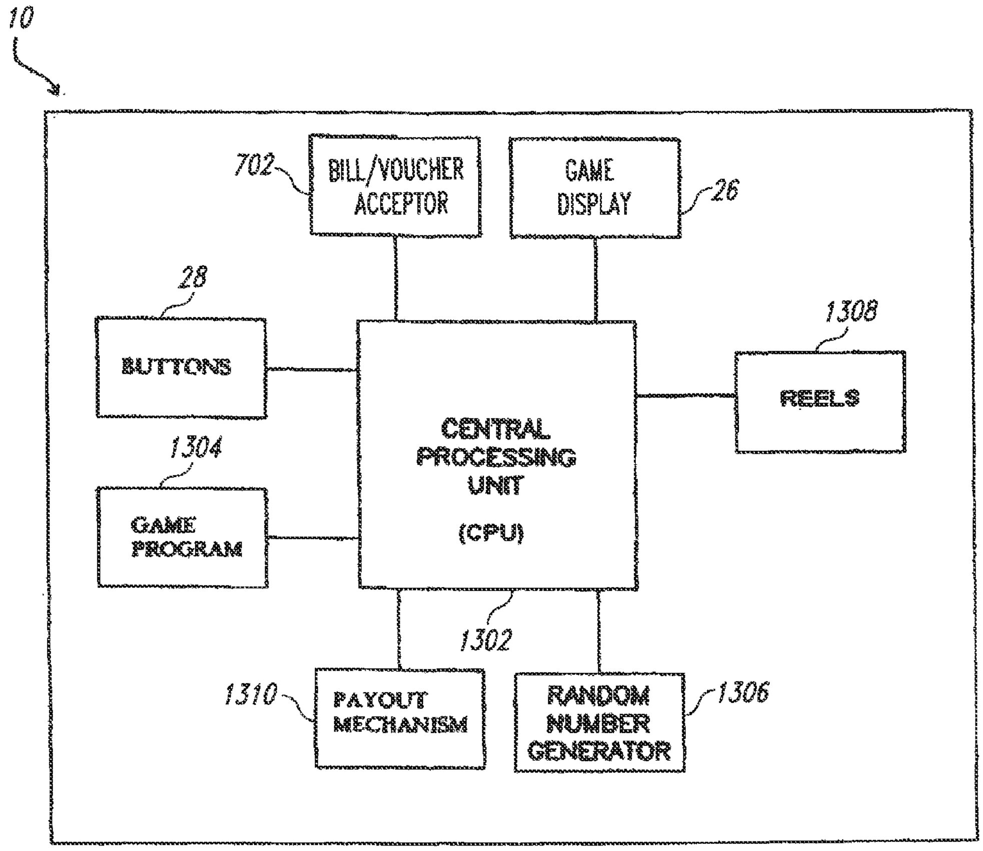
FIG. 13 is a high-level block diagram of the gaming device of FIG. 7.

In accordance with one embodiment, FIG. 13 is a block diagram showing the interconnection of physical and logical components within the gaming device 10. Bill/voucher acceptor 702 may be connected to a conventional central processing unit ("CPU") 1302, such as an Intel Pentium microprocessor mounted on a gaming device board (not shown), by a serial connection, such as RS-232 or USB. The gaming device board may carry other components as well, such as those found on conventional personal computer motherboards. The gaming device board may also be loaded with a gaming device operating system (OS), such as an Alpha OS installed within an S9000, M9000 or CineVision™ slot machine made by Bally Technologies, Inc. CPU 1302 may execute a game program 1304 that causes a game display 26 to display a game. In one embodiment, the game program 1304 may be a game entitled Double Dragon Deluxe.

When a player has inserted a form of currency, such as, for example and without limitation, paper currency, coins or tokens, cashless tickets or vouchers, electronic funds transfers or the like, a signal may be sent to CPU 1302, which, in turn, may assign an appropriate number of credits for play. The player may further control the operation of gaming device 10, for example, by selecting the amount to wager via electromechanical or other player-activated buttons 28.

The game may start in response to the player pushing one of the buttons 28 or by an alternate start mechanism, such as a handle or touchscreen icon (not shown). Random number generator 1306 may respond to instructions from the CPU 1302 to provide a display of randomly selected indicia on the game display 26. In some embodiments, random number generator 1306 may be physically separate from the gaming device 10; for example, it may be part of a central determination host system (not shown) that provides random game outcomes to CPU 1302. Finally, CPU 1302, under control of the game program 1304, may compare the final display of indicia to a pay table.

The set of possible game outcomes may include a subset of outcomes related to the triggering of a feature game. In the event the displayed outcome is a member of this subset, CPU 1302, under control of game program 1304, may cause feature game play to be presented on at least one of the game display 26 or reels 1308.

In other embodiments, the feature game may be one of a set of primary games randomly selected for play, as disclosed in U.S. patent application Ser. No. 11/428,220, entitled "Multiple Primary Games Triggered by Random Number Generator," filed on Jun. 30, 2006, which is hereby incorporated by reference in its entirety. The gaming device may, for example, have at least two distinct primary games. After receiving a wager, the gaming device may determine which primary game to activate. The selected primary game may then be activated and a game outcome presented to the player on at least one game display. A payout may then be awarded according to the game outcome.

Predetermined payout amounts for certain outcomes, including feature game outcomes, may be stored as part of the game program 1304. Such payout amounts may, in response to instructions from CPU 1302, be provided to the player in the form of coins, credits or currency via a payout mechanism 1310, which may be one or more of a credit meter, a coin hopper, a voucher printer, an electronic funds transfer protocol or any other payout means.

In one embodiment, the game program 1304 may be stored in memory (not shown) connected to or mounted on the gaming device board. For example, such memory may comprise an external memory device, a hard drive, CD-ROMs, DVDs, and/or flash memory. In an alternative embodiment, game programs may be stored in a remote storage device, which may in turn be housed in a remote server. The gaming device 10 may access the remote storage device via any type of network connection, including via a local area network connection, a TCP/IP connection or a wireless connection. In addition, other data, including graphics, sound files and other media data for use with the gaming device 10, may also be stored in the same or a separate memory device (not shown). Some or all of the game program 1304 and its associated data may be loaded from one memory device into another, for example, from flash memory to random access memory (RAM).

Figure 14:
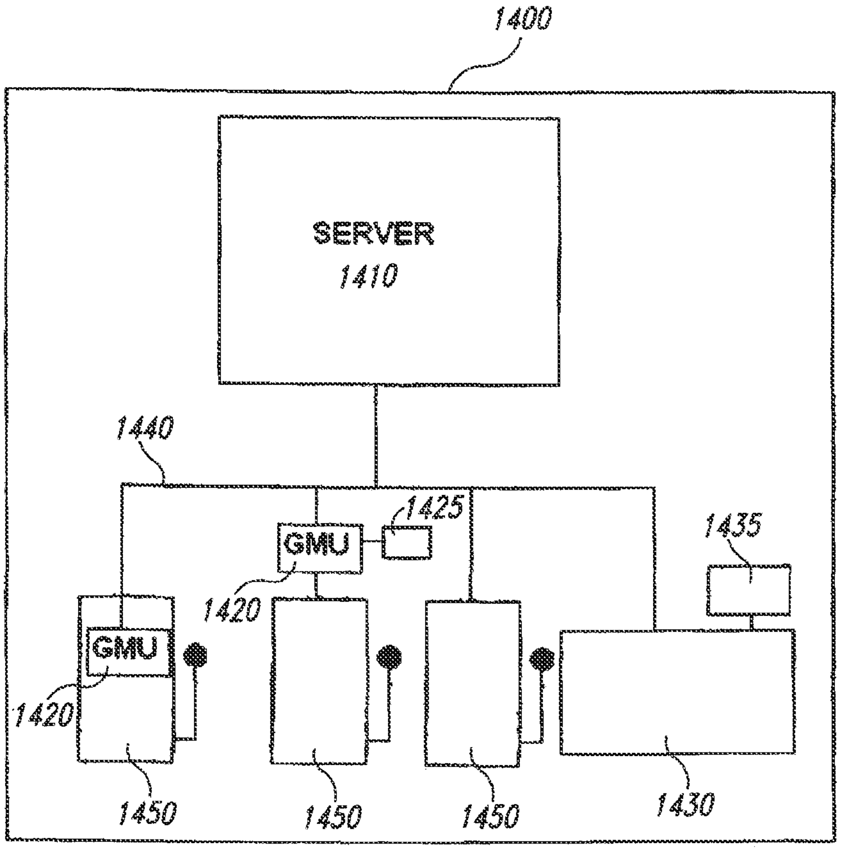
FIG. 14 illustrates an example casino management system including gaming devices with two card readers, in accordance with one embodiment.

Referring to FIG. 14, in accordance with one aspect of the invention, a gaming system 1400 may include a server 1410, gaming devices 1450, and a network 1440 connecting the gaming devices 1450 to the server 1410. Additionally, a gaming display computer 1430 is shown connected to network 1440. The server 1410 may be selected from a variety of servers. The type of server used may be determined by the platform and software requirements of the gaming system 1400. Examples of suitable servers are an IBM RS6000-based server, an IBM AS/400-based server or a Microsoft Windows-based server, but it should be appreciated that any suitable server may be used. The server 1410 may also be configured as a single "logical" server that comprises multiple physical servers.

Gaming devices 1450 may operate similarly to peripheral networked terminals. Gaming devices 1450 may have a player interface, such as a display, two card readers, and selection buttons through which the gaming devices 1450 may interact with a player playing a game. The player interface may be used for making choices, such as the amount of a bet or the number of lines to bet. Gaming devices 1450 may also provide information to the server 1410 concerning activity on the gaming devices 1450 and may provide a communication portal for players with server 1410. For example, the player interface may be used to select different server-related menu options, such as transferring a specified number of credits from a player account at the casino onto a credit meter of a gaming device 1450, or for transferring credits from the gaming device 1450 back to the player account.

In various embodiments, any of the gaming devices 1450 may be a mechanical reel spinning slot machine, video slot machine, video poker machine, keno machine, video blackjack machine, or a gaming device offering one or more of the above described primary games. Alternately, gaming devices 1450 may provide a set of multiple primary games selected for play by a random number generator as discussed above. Networking components (not shown) may facilitate communications across the network 1440 between the server 1410 and game management units (GMUs) 1420 and/or gaming display control computers 1430 that control displays for carousels of gaming devices. GMUs 1420 may connect the gaming devices 1450 to networking components and may be installed in the gaming device housing or externally to the gaming devices 1450. The function of the GMU 1420 may be similar to the function of a network interface card connected to a desktop personal computer (PC). Some GMUs 1420 may have greater capability and can perform such tasks as presenting and playing a game having feature games using a display 1425 operatively connected to the GMU 1420. In one embodiment, one or more gaming devices 1450 may connect directly to the network and are not connected via a GMU 1420. A gaming system of the type described above also may allow a plurality of games to be linked under the control of a server 1410 for cooperative or competitive play in a particular area, carousel, casino or between casinos located in geographically separate areas.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims. One will appreciate that a gaming system may also comprise other types of components, and the above illustrations are meant only as examples and not as limitations to the types of components or games having an indicia-driven contest element.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information can be stored on any computer readable medium for use by or in connection with any processor-related system or method. In the context of this document, a memory is a computer readable medium that is an electronic, magnetic, optical, or other physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer readable medium" can be any means that can store, communicate, propagate, or transport the program associated with logic and/or information for use by or in connection with the instruction execution system, apparatus, and/or device. The computer readable medium can be, for example, but is not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

We claim:

1. A gaming device, comprising:

a housing;

a game display carried by the housing for displaying one or more games;

a first card reader carried by the housing and configured to read information from card media including player club card media issued by a casino and indicative of a player identity of a respective player to whom a respective one of the player club card media was issued by the casino, financial card media issued by a financial institution and indicative of a financial account of the respective player, and technician card media indicative of a technician identity of a respective technician authorized to service the gaming device;

a second card reader carried by the housing and configured to read information from card media including the player club card media, the financial card media, and the technician card media;

a controller housed by the housing and communicatively coupled to at least one of the first or the second card readers, the controller responsive to selectively provide diagnostic access to the gaming device based at least in part on information read from the technician card media by at least one of the first or the second card readers, the information read from the technician card media which identifies the respective technician; and a visual display carried by the housing, the visual display adjacent at least one of the first card reader and the second card reader, the visual display communicatively coupled to the controller, the visual display operable to display information identifying a type of card media to be inserted into a respective one of the first card reader and the second card reader, the displayed information based on a respective card media insertion status.

2. The gaming device of claim 1, wherein the controller is communicatively coupled to both the first card reader and the second card reader and configured to receive the player identity information from one of the first card reader and the second card reader and the financial account information from the other of the first card reader and the second card reader.

3. The gaming device of claim 2, wherein the first card reader includes a first sensor and a first interface printed circuit board (PCB) configured to process a signal from the first sensor, and the second card reader includes a second sensor and a second interface printed circuit board (PCB) configured to process a signal from the second sensor.

4. The gaming device of claim 3, wherein the controller is coupled to the first interface PCB and the second interface PCB.

5. The gaming device of claim 3, wherein the first sensor comprises a first magnetic pickup, and the second sensor comprises a second magnetic pickup.

6. The gaming device of claim 2, wherein the visual display displays information associated with the player club card media and the financial card media.

7. The gaming device of claim 1, wherein the first card reader includes a first sensor, and the second card reader includes a second sensor, further comprising:

a shared interface printed circuit board coupled to the first card reader and the second card reader and configured to process signals from the first sensor and from the second sensor.

8. The gaming device of claim 1, wherein the first card reader comprises an insertion-type card reader, and the second card reader comprises a swipe-type card reader.

9. The gaming device of claim 8, wherein the swipe-type card reader is oriented such that the card media may be swiped horizontally.

10. The gaming device of claim 1, wherein the first card reader comprises a first insertion-type card reader, and the second card reader comprises a second insertion-type card reader.

11. The gaming device of claim 1, wherein the first card reader comprises a first swipe-type card reader, and the second card reader comprises a second swipe-type card reader.

12. The gaming device of claim 1, wherein the first card reader includes at least one indicator light.

13. The gaming device of claim 1, wherein the first card reader is positioned adjacent the second card reader, and a dimension of the visual display is similar to a respective dimension of a slot of at least one of the first card reader and the second card reader.

14. The gaming device of claim 1, wherein the respective card media insertion status includes an insertion status of card media inserted into the other of the respective one of the first card reader and the second card reader and an insertion status of the type of the card media inserted into the other of the respective one of the first card reader and the second card reader.

15. The gaming device of claim 1, further comprising:

at least one touch sensitive input device carried by the housing, the at least one touch sensitive input device adjacent the visual display, the at least one touch sensitive input device communicatively coupled to the controller, the at least one touch sensitive input device operable to receive input from a user and provide signals to the controller in response thereto.

16. The gaming device of claim 15, wherein the at least one touch sensitive input device comprises at least one touch-activated bar, the input is a user touch that includes taps, drags and double taps, and in response to the input the controller causes at least one of a scroll of a page presented on the visual display, selection based upon information presented on the visual display or activation of a function presented on the visual display.

17. The gaming device of claim 15, wherein the at least one touch sensitive input device comprises at least one soft key, the at least one soft key corresponds to at least one function, the at least one function of the at least one soft key identified on the visual display.

18. The gaming device of claim 15, wherein the at least one touch sensitive input device comprises a touchpad, and in response to the input the controller causes at least one of a navigation of a pointer displayed on the visual display, a scroll of a menu displayed on the visual display or a selection based upon information provided on the visual display.

19. The gaming device of claim 18, wherein the at least one touch sensitive input device further comprises at least one touchpad button.

20. A method of operating a gaming device, comprising:

receiving a first card within a first card reader carried by the gaming device;

reading information from the first card indicative of at least one of a player identity of a respective player to whom the first card was issued by a casino, a financial account of the respective player, or a technician identity of a technician authorized to service the gaming device;

receiving a second card within a second card reader carried by the gaming device;

reading information from the second card indicative of at least one of the player identity, the financial account, or the technician identity;

selectively providing diagnostic access to the gaming device based at least in part on information read which identifies the technician authorized to service the gaming device; and displaying information identifying a type of card media to be inserted into a respective one of the first card reader and the second card reader, the displayed information based on a respective card insertion status.

21. The method of claim 20, further comprising:

determining that one of the first card and the second card is a player club card issued by the casino;

processing the player identity information based at least in part on the determination that the one of the first card and the second card is the player club card;

determining that the other of the first card and the second card is a technician identity card issued by the casino; and processing the technician identity information based at least in part on the determination that the other of the first card and the second card is the technician identity card.

22. The method of claim 20, wherein receiving the second card includes receiving the second card within a swipe-type card reader.

23. The method of claim 20, further comprising:

receiving the player identity information and the financial account information at a controller.

24. The method of claim 20, further comprising:

determining whether the player identity information read from one of the first card and the second card matches an identity associated with the financial account information read from the other of the first card and the second card.

25. The method of claim 20, further comprising:

transferring money from the financial account to a player account at a casino associated with the first card.

26. The method of claim 20, further comprising:

determining that one of the first card and the second card is a technician identity card issued by the casino;

processing the technician identity information based at least in part on the determination that the one of the first card and the second card is the technician identity card;

determining that the other of the first card and the second card is a financial card issued by a financial institution; and processing the financial account information based at least in part on the determination that the other of the first card and the second card is the financial card.

27. A gaming device, comprising:

a housing;

a game display carried by the housing for displaying one or more games;

a first reading means carried by the housing for reading information indicative of at least one of a player identity from a player club card issued by a casino, a financial account from a financial card issued by a financial institution, and a technician identity from a technician identity card issued by the casino;

a second reading means carried by the housing for reading information indicative of at least one of the player identity, the financial account, and the technician identity means for selectively providing diagnostic access to the gaming device based at least in part on information read which identifies the technician authorized to service the gaming device; and a displaying means carried by the housing for displaying information identifying a type of card media to be inserted into a respective one of the first reading means and the second reading means, the displayed information based on a respective card media insertion status.

* * * * *